US010969560B2

(12) United States Patent
Symmons et al.

(10) Patent No.: US 10,969,560 B2
(45) Date of Patent: Apr. 6, 2021

(54) INTEGRATED OPTICAL ASSEMBLY AND MANUFACTURING THE SAME

(71) Applicant: LightPath Technologies, Inc., Orlando, FL (US)

(72) Inventors: Alan Symmons, Winter Springs, FL (US); Jeremy Huddleston, Oviedo, FL (US); Edward Foote, Winter Springs, FL (US); Spencer Novak, Winter Springs, FL (US)

(73) Assignee: LIGHTPATH TECHNOLOGIES, INC., Orlando, FL (US)

( * ) Notice: Subject to any disclaimer, the term of this patent is extended or adjusted under 35 U.S.C. 154(b) by 0 days.

(21) Appl. No.: 15/828,300

(22) Filed: Nov. 30, 2017

(65) Prior Publication Data

US 2018/0321457 A1 Nov. 8, 2018

Related U.S. Application Data

(60) Provisional application No. 62/501,292, filed on May 4, 2017.

(51) Int. Cl.
*G02B 7/02* (2006.01)
*B29D 11/00* (2006.01)
*G02B 5/00* (2006.01)
*G02B 13/14* (2006.01)

(52) U.S. Cl.
CPC .............. *G02B 7/028* (2013.01); *B29D 11/00* (2013.01); *G02B 7/02* (2013.01); *G02B 7/021* (2013.01); *G02B 7/022* (2013.01); *B29D 11/00403* (2013.01); *G02B 5/005* (2013.01); *G02B 13/14* (2013.01)

(58) Field of Classification Search
CPC .......... G02B 7/028; G02B 7/02; G02B 7/021; G02B 7/022; G02B 5/005; G02B 13/14; B29D 11/00; B29D 11/00403
USPC ........................................................ 359/356
See application file for complete search history.

(56) References Cited

U.S. PATENT DOCUMENTS

| | | | |
|---|---|---|---|
| 2,373,815 A | 4/1945 | Riccio |
| 2,410,616 A | 11/1946 | Webb |
| 3,348,045 A | 10/1967 | Brau |
| 3,784,287 A | 1/1974 | Grey |
| 3,794,704 A | 2/1974 | Strong |
| 3,806,079 A | 4/1974 | Beattie |
| 3,820,968 A | 6/1974 | Haisty |
| 3,833,347 A | 9/1974 | Angle |

(Continued)

OTHER PUBLICATIONS

Symmons and Auz, "Design Considerations and Manufacturing Limitations of Insert Precision Glass Molding (IPGM)", Proc. Of SPIE vol. 8489, Polymer Optics and Molded Glass Optics: Design, Fabrication, and Materials II, pp. 84890H-1-84890H-22, Oct. 19, 2012.

(Continued)

*Primary Examiner* — Collin X Beatty
(74) *Attorney, Agent, or Firm* — Knobbe, Martens, Olson & Bear LLP

(57) ABSTRACT

An integrated optical assembly comprises an optics mount, an optical element comprising material that is optically transparent, the optical element molded in the optics mount, and an optical aperture wherein the optical aperture is secured in fixed position with respect to the optics mount and the transparent optical element.

20 Claims, 18 Drawing Sheets

(56) References Cited

U.S. PATENT DOCUMENTS

| | | |
|---|---|---|
| 3,877,792 A | 4/1975 | Cox |
| 3,904,278 A | 4/1975 | Hummel |
| 3,900,328 A | 8/1975 | Parsons |
| 3,982,206 A | 9/1976 | Poulsen |
| 4,015,897 A | 4/1977 | Konoma |
| 4,139,677 A | 2/1979 | Blair |
| 4,168,961 A | 2/1979 | Blair |
| 4,249,927 A | 2/1981 | Fukuzaki |
| 4,258,982 A | 3/1981 | Skinner |
| 4,318,594 A | 3/1982 | Hanada |
| 4,362,819 A | 3/1982 | Olszewski |
| 4,391,915 A | 7/1983 | Gertraud |
| 4,415,235 A | 11/1983 | Coates |
| 4,435,200 A | 3/1984 | Joormann |
| 4,440,699 A | 4/1984 | Smid |
| 4,481,023 A | 11/1984 | Marechal |
| 4,537,473 A | 8/1985 | Maschmeyer |
| 4,582,655 A | 4/1986 | Greener |
| 4,591,373 A | 5/1986 | Sato |
| 4,591,626 A | 5/1986 | Hiromasa Kawai |
| 4,566,930 A | 6/1986 | Hiromasa Kawai |
| 4,592,627 A | 6/1986 | Smid |
| 4,606,750 A | 8/1986 | Torii |
| 4,629,487 A | 12/1986 | Monji |
| 4,641,929 A | 2/1987 | Braat |
| 4,643,538 A | 2/1987 | Wilson |
| 4,685,948 A | 8/1987 | Kuribayashi |
| 4,696,692 A | 9/1987 | Schmitt |
| 4,712,887 A | 9/1987 | Baer |
| 4,698,089 A | 10/1987 | Matsuzaka |
| 4,704,371 A | 11/1987 | Krolla |
| 4,721,518 A | 1/1988 | Monji |
| 4,734,118 A | 3/1988 | Marechal |
| 4,747,864 A | 3/1988 | Hagerty |
| 4,737,006 A | 4/1988 | Warbrick |
| 4,778,505 A | 10/1988 | Hirota |
| 4,849,378 A | 7/1989 | Hench |
| 4,854,958 A | 8/1989 | Marechal |
| 4,883,528 A | 8/1989 | Carpenter |
| 4,867,544 A | 9/1989 | Bornstein |
| 4,883,522 A | 11/1989 | Hagerty |
| 4,891,053 A | 1/1990 | Bartman |
| 4,897,101 A | 1/1990 | Carpenter |
| 4,929,265 A | 1/1990 | Carpenter |
| 4,907,864 A | 3/1990 | Hagerty |
| 4,918,702 A | 4/1990 | Kimura |
| 4,929,065 A | 5/1990 | Hagerty |
| 4,941,906 A | 5/1990 | Schmitt |
| 4,942,144 A | 7/1990 | Martin |
| 4,964,903 A | 7/1990 | Carpenter |
| 4,948,627 A | 8/1990 | Hata |
| 4,969,944 A | 10/1990 | Marechal |
| 5,022,921 A | 1/1991 | Aitken |
| 5,002,375 A | 3/1991 | Komplin |
| 5,007,689 A | 4/1991 | Kelly |
| 5,021,366 A | 4/1991 | Aitken |
| 5,026,415 A | 6/1991 | Yamamoto |
| 5,032,160 A | 7/1991 | Murata |
| 5,044,737 A | 9/1991 | Blankenbecler |
| 5,071,674 A | 12/1991 | Nogues |
| 5,074,916 A | 12/1991 | Hench |
| 5,076,980 A | 12/1991 | Nogues |
| 5,080,962 A | 1/1992 | Hench |
| 5,105,408 A | 4/1992 | Lee |
| 5,125,750 A | 4/1992 | Corle |
| 5,125,945 A | 6/1992 | Menihan |
| 5,125,949 A | 6/1992 | Hirota |
| 5,171,348 A | 6/1992 | Umetani |
| 5,147,829 A | 9/1992 | Hench |
| 5,148,446 A | 9/1992 | Radich |
| 5,171,347 A | 12/1992 | Monji |
| 5,173,100 A | 12/1992 | Shigyo |
| 5,173,958 A | 12/1992 | Folsom |
| 5,181,224 A | 1/1993 | Snyder |
| 5,200,858 A | 4/1993 | Hagerty |
| 5,202,880 A | 4/1993 | Lee |
| 5,228,894 A | 4/1993 | Sato |
| 5,236,486 A | 4/1993 | Blankenbecler |
| 5,216,730 A | 6/1993 | Demerritt |
| 5,217,516 A | 6/1993 | Ishiguro |
| 5,222,092 A | 6/1993 | Hench |
| 5,251,060 A | 8/1993 | Uenishi |
| 5,262,896 A | 10/1993 | Blankenbecler |
| 5,274,456 A | 11/1993 | Izumi |
| 5,274,502 A | 12/1993 | Demerritt |
| 5,275,637 A | 1/1994 | Sato |
| 5,276,538 A | 1/1994 | Monji |
| 5,307,336 A | 1/1994 | Lee |
| 5,296,724 A | 3/1994 | Ogata |
| 5,306,339 A | 4/1994 | Takeda |
| 5,311,611 A | 5/1994 | Migliaccio |
| 5,346,523 A | 9/1994 | Sugai |
| 5,356,667 A | 10/1994 | Hench |
| 5,388,006 A | 1/1995 | Koelsch |
| 5,392,431 A | 2/1995 | Ffisterer |
| 5,400,072 A | 2/1995 | Izumi |
| 5,402,510 A | 3/1995 | Kalonji |
| 5,405,652 A | 4/1995 | Kashiwagi |
| 5,421,849 A | 4/1995 | Hirota |
| 5,436,764 A | 6/1995 | Umetani |
| 5,459,613 A | 7/1995 | Xu |
| 5,457,759 A | 10/1995 | Kalonji |
| 5,481,631 A | 1/1996 | Cahill |
| 5,504,623 A | 3/1996 | Xu |
| 5,504,350 A | 4/1996 | Ortyn |
| 5,504,731 A | 4/1996 | Lee |
| 5,521,705 A | 4/1996 | Oldenbourg |
| 5,553,174 A | 5/1996 | Snyder |
| 5,529,961 A | 6/1996 | Aitken |
| 5,538,528 A | 7/1996 | Kashiwagi |
| 5,538,674 A | 7/1996 | Nisper |
| 5,540,746 A | 7/1996 | Sasaki |
| 5,572,367 A | 11/1996 | Jung |
| 5,582,626 A | 12/1996 | Blankenbecler |
| 5,606,461 A | 2/1997 | Ohshita |
| 5,617,252 A | 2/1997 | Manhart |
| 5,616,161 A | 4/1997 | Morikita |
| 5,630,857 A | 4/1997 | Xu |
| 5,631,771 A | 5/1997 | Swan |
| 5,689,374 A | 5/1997 | Xu |
| 5,638,212 A | 6/1997 | Meyers |
| 5,668,066 A | 9/1997 | Oguma |
| 5,676,723 A | 10/1997 | Taniguchi |
| 5,685,358 A | 11/1997 | Kawasaki |
| 5,701,207 A | 11/1997 | Waketa |
| 5,705,105 A | 1/1998 | Inoue |
| 5,709,723 A | 1/1998 | Gearing |
| 5,715,091 A | 1/1998 | Meyers |
| 5,728,324 A | 2/1998 | Welch |
| 5,762,676 A | 3/1998 | Richards |
| 5,768,030 A | 6/1998 | Estelle |
| 5,796,525 A | 6/1998 | Dempewolf |
| 5,815,318 A | 8/1998 | Dempewolf |
| 5,808,803 A | 9/1998 | Ullmann |
| 5,811,799 A | 9/1998 | Wu |
| 5,843,200 A | 10/1998 | Richards |
| 5,851,252 A | 12/1998 | Sato |
| 5,855,641 A | 1/1999 | Taniguchi |
| 5,876,478 A | 3/1999 | Imamura |
| 5,898,522 A | 4/1999 | Herpst |
| 5,900,033 A | 5/1999 | Gearing |
| 5,902,369 A | 5/1999 | Sakamoto |
| 5,917,105 A | 5/1999 | Xu |
| 5,936,777 A | 6/1999 | Dempewolf |
| 5,946,140 A | 8/1999 | Huang |
| 5,965,069 A | 10/1999 | Murata |
| 5,973,827 A | 10/1999 | Chipper |
| 5,992,179 A | 11/1999 | Xu |
| 6,003,339 A | 12/1999 | Morikita |
| 6,014,483 A | 1/2000 | Thual |
| 6,019,522 A | 2/2000 | Kim |
| 6,027,672 A | 2/2000 | Weitzel |
| 6,029,475 A | 2/2000 | Abromov |
| 6,031,947 A | 2/2000 | Laor |

(56) References Cited

U.S. PATENT DOCUMENTS

| | | |
|---|---|---|
| 6,033,515 A | 2/2000 | Walters |
| 6,040,943 A | 3/2000 | Schaub |
| 6,070,436 A | 3/2000 | Hirota |
| 6,059,462 A | 5/2000 | Finak |
| 6,075,650 A | 6/2000 | Morris |
| 6,119,485 A | 6/2000 | Hibino |
| 6,093,484 A | 7/2000 | Oguma |
| 6,137,632 A | 9/2000 | Bernacki |
| 6,126,775 A | 10/2000 | Cullen |
| 6,141,991 A | 10/2000 | Fujimoto |
| 6,142,678 A | 11/2000 | Cheng |
| 6,151,915 A | 11/2000 | Hirota |
| 6,156,243 A | 11/2000 | Kosuga |
| 6,168,319 B1 | 1/2001 | Francis |
| 6,195,208 B1 | 2/2001 | Ngoi |
| 6,217,698 B1 | 2/2001 | Walters |
| 6,219,169 B1 | 4/2001 | Iizuka |
| 6,259,567 B1 | 4/2001 | Brown |
| 6,225,244 B1 | 5/2001 | Oguma |
| 6,252,708 B1 | 6/2001 | Cullen |
| 6,260,387 B1 | 7/2001 | Richards |
| 6,278,656 B1 | 7/2001 | Tyagi |
| 6,301,059 B1 | 10/2001 | Huang |
| 6,305,194 B1 | 10/2001 | Budinski |
| 6,335,836 B2 | 1/2002 | Ando |
| 6,337,774 B2 | 1/2002 | Ando |
| 6,339,504 B1 | 1/2002 | Oliva |
| 6,347,015 B2 | 2/2002 | Ando |
| 6,352,376 B2 | 3/2002 | Walters |
| 6,360,039 B1 | 3/2002 | Bernard |
| 6,363,747 B1 | 3/2002 | Budinski |
| 6,385,997 B1 | 5/2002 | Nelson |
| 6,392,813 B1 | 5/2002 | Reardon |
| 6,395,126 B1 | 5/2002 | Cullen |
| 6,400,858 B1 | 6/2002 | Laor |
| 6,441,971 B2 | 8/2002 | Ning |
| 6,540,411 B1 | 4/2003 | Cheng |
| 6,560,994 B1 | 5/2003 | Hirota |
| 6,563,975 B2 | 5/2003 | Towery |
| 6,592,785 B1 | 7/2003 | Mukasa |
| 6,603,906 B2 | 8/2003 | Qin |
| 6,615,711 B2 | 9/2003 | Matsuzuki |
| 6,634,189 B1 | 10/2003 | Hugens |
| 6,661,582 B1 | 12/2003 | Rolt |
| 6,665,125 B2 | 12/2003 | Oliva |
| 6,668,588 B1 | 12/2003 | Hilton |
| 6,674,942 B2 | 1/2004 | Chang |
| 6,714,703 B2 | 3/2004 | Lee |
| 6,758,611 B1 | 6/2004 | Levin |
| 6,758,935 B2 | 7/2004 | Bernard |
| 6,761,046 B2 | 7/2004 | Nelson |
| 6,766,660 B2 | 7/2004 | Tojo |
| 6,766,661 B2 | 7/2004 | Sawada |
| 6,780,274 B2 | 7/2004 | Bernard |
| 6,795,461 B1 | 9/2004 | Blair |
| 6,798,943 B2 | 9/2004 | Towery |
| 6,804,435 B2 | 10/2004 | Robilliard |
| 6,806,217 B2 | 10/2004 | Furukawa |
| 6,810,686 B2 | 11/2004 | Hirota |
| 6,813,103 B2 | 11/2004 | Tansho |
| 6,820,445 B2 | 11/2004 | Gratrix |
| 6,823,694 B2 | 11/2004 | Sawada |
| 6,823,695 B2 | 11/2004 | Fukuyama |
| 6,826,213 B1 | 11/2004 | Edwards |
| 6,829,284 B2 | 12/2004 | Ori |
| 6,837,625 B2 | 1/2005 | Schott |
| 6,854,289 B2 | 2/2005 | Yoshikumi |
| 6,865,333 B2 | 3/2005 | Porter |
| 6,918,267 B2 | 7/2005 | Hirota |
| 6,935,136 B2 | 8/2005 | Otsuki |
| 7,017,374 B2 | 1/2006 | Bogert |
| 7,088,530 B1 | 3/2006 | Recco |
| 7,146,075 B2 | 8/2006 | Tinch |
| 6,984,598 B1 | 10/2006 | Hilton |
| 7,143,609 B2 | 12/2006 | Aitken |
| 7,157,391 B2 | 1/2007 | Kuasuga |
| 7,159,420 B2 | 1/2007 | Autery |
| 7,171,827 B2 | 2/2007 | Autery |
| 7,369,303 B2 | 5/2008 | Tejada |
| 7,386,998 B2 | 6/2008 | Kikuchi |
| 7,561,355 B2 | 7/2009 | Nakamura |
| 7,576,020 B2 | 8/2009 | Hayashi |
| 7,578,145 B2 | 8/2009 | Yoshida |
| 7,618,909 B2 | 11/2009 | Fujiwara |
| 7,644,596 B2 | 1/2010 | Ookahara |
| 8,158,541 B2 | 4/2012 | Ikenishi |
| 8,189,277 B2 | 5/2012 | Kintz |
| 8,365,554 B2 | 2/2013 | Fukumoto |
| 8,422,138 B2 | 4/2013 | Ovrutsky |
| 8,908,268 B2 | 12/2014 | Lee |
| 9,174,399 B2 * | 11/2015 | Watanabe ......... B29C 45/14336 |
| 2003/0007203 A1 | 1/2003 | Amon |
| 2005/0219724 A1 | 10/2005 | Teramoto |
| 2006/0079389 A1 | 4/2006 | Hayashi |
| 2009/0163345 A1 | 6/2009 | Onoda |
| 2009/0290833 A1 | 11/2009 | Han |
| 2010/0022378 A1 | 1/2010 | Nguyen |
| 2012/0003425 A1 | 1/2012 | Brahmandam |
| 2012/0075725 A1 | 3/2012 | Huddleston |
| 2012/0188635 A1 * | 7/2012 | Kubala ................. G02B 7/003 359/356 |
| 2012/0206796 A1 | 8/2012 | Gibson |
| 2012/0212805 A1 * | 8/2012 | Koide ................... G02B 7/021 359/356 |
| 2012/0238432 A1 | 9/2012 | Nguyen |
| 2013/0208353 A1 | 8/2013 | Huddleston |
| 2013/0249034 A1 * | 9/2013 | Andre ............. B29D 11/00375 257/432 |
| 2014/0256379 A1 * | 9/2014 | Hsu ........................ G03B 3/10 455/556.1 |
| 2014/0307341 A1 * | 10/2014 | Uno ........................ G02B 7/08 359/824 |
| 2015/0109456 A1 | 4/2015 | Ovrutsky |
| 2015/0293330 A1 * | 10/2015 | Gutierrez ........... G02B 13/0015 359/811 |
| 2016/0124180 A1 * | 5/2016 | Chern .................. G02B 13/008 348/164 |

OTHER PUBLICATIONS

Huddleston et al., "Investigation of As40Se60 chalcogenide glass in precision glass molding for high-volume thermal imaging lenses", Proc. of SPIE Vol. 9451, Infrared Technology and Applications XLI, pp. 94511O-1-94511O-14, May 26, 2015.

\* cited by examiner

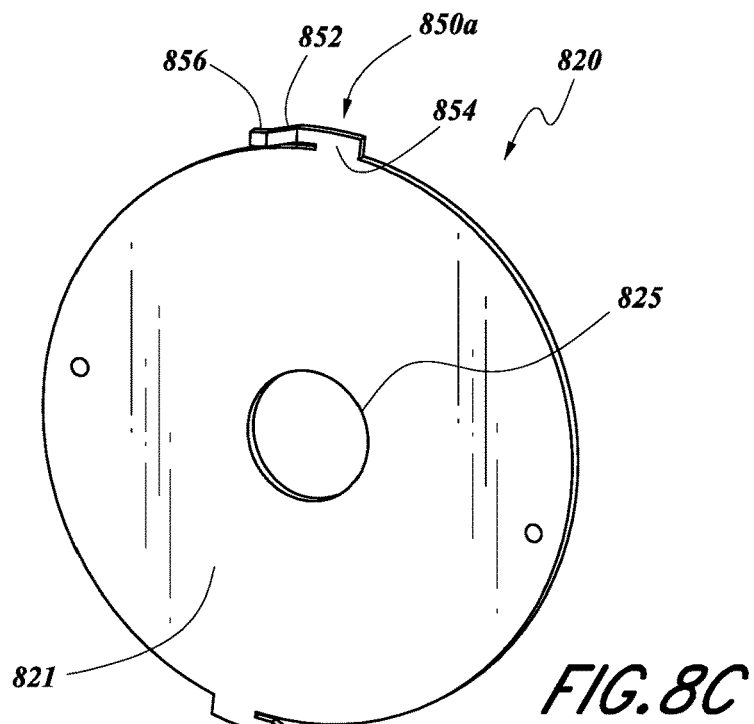
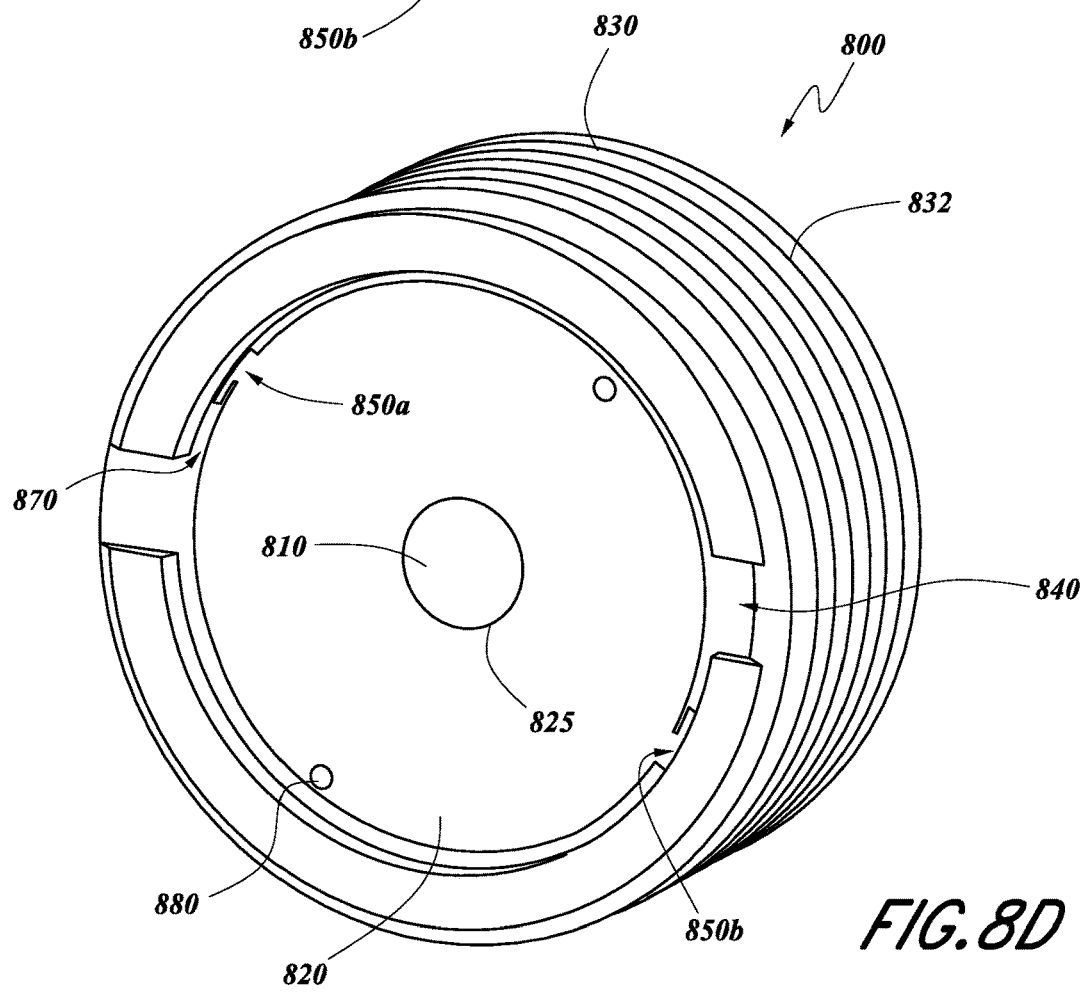

INTEGRATED OPTICAL ASSEMBLY AND MANUFACTURING THE SAME

CROSS-REFERENCE TO RELATED APPLICATIONS

This application claims the benefit of priority under 35 U.S.C. § 119(e) to U.S. Provisional Patent Application No. 62/501,292 filed May 4, 2017, entitled "INTEGRATED OPTICAL ASSEMBLY AND MANUFACTURING THE SAME," the contents of which are hereby incorporated by reference herein in their entirety.

BACKGROUND OF THE INVENTION

Field

The present disclosure relates to precision optical assemblies and methods of manufacturing the same, such as, for example, to optical assemblies including precision optical elements for use in the infrared (IR) spectrum of electromagnetic radiation.

Description of the Related Art

Specific mounting techniques and handling may be used for optical elements and lenses that are configured to propagate light within the infrared spectrum. The specific techniques may improve the likelihood that the elements survive handling and environmental conditions while providing the desired optical performance. For example, infrared optics may comprise glass materials having a low coefficient of thermal expansion (CTE) relative to the higher CTEs of common machining materials. The common machined materials may be used in mechanical parts such as mounts and holders that facilitate the installation of the optical elements into a higher level optical system. The insertion of the optical elements into these mechanical parts, e.g., optics mounts, may involve steps to attenuate the risk that the optical elements break as the higher level system experiences temperature changes.

In some case, for example, IR optical elements may be inserted into optics mounts with epoxies and silicones. These epoxies and silicones may be selected due to physical properties that permit them to remain partially pliable such that they do not cure to a rigid, hardened state. The pliable properties of the epoxy or silicone coupled with the amount of the epoxy or silicone used, may allow the optical element and optics mounts to expand and contract at different rates without damaging the optical elements. However, utilizing these epoxies or silicones may present challenges. For example, to prepare the optical element for the epoxy, surfaces of the optical elements having the epoxy thereon may be thoroughly cleaned and a primer may be applied thereto. A mechanical fixture may also be used to fix the optical element into precise position for application of the epoxy. Once the epoxy is cured, the mechanical fixture is removed. Moreover, several of these steps may be dependent on operator proficiency, which may be subject to human error. Accordingly, positioning and/or alignment may be less precise than desired for high precision IR optical assemblies.

Alternatively, some methods may include rigidly bonding the optical element to the optics mounts. However, due to contraction and expansion as a result of the temperature change, this method may involve precisely matching the material of the machined optical mount with the material of the optical element. Thus, to match the CTE of both materials to reduce a risk of breaking the optical element, the optics mounts may comprise expensive materials, such as titanium or kovar.

Optical elements can also be mounted into optics mounts through the use of additional parts. In some cases, for example, the optical element rests in a pocket in the optics mount. The additional part, sometimes referred to as a retainer, may mount to the optics mount via, for example, a thread or bolt pattern. A third intermediate part may be used to interface between the optical element and either the retainer or optics mount. The third intermediate part is generally made of a pliable material that is able to expand and contract over the temperature variation range of the higher level assembly. The third intermediate part may compensate for expansion or contraction between the optical element and the optics mount. The third intermediate part may also maintain pressure on the optical element ensuring the optical element does not move and continues to perform as desired. The third intermediate part can be a spring, o-ring, or rubber gasket material that maintains flexibility over the range of variation of system temperature.

SUMMARY

Various implementations of methods and apparatus within the scope of the appended claims each have several aspects, no single one of which is solely responsible for the desirable attributes herein. Without limiting the scope of the appended claims, some prominent features are described herein.

Some examples of integrated optical assemblies and methods of fabricating an integrated optical assembly that may include various aspects of the invention disclosed herein are presented below.

1. An integrated optical assembly comprising:
   an optics mount comprising an opaque material, said optics mount being tubular in shape and having a first end and a second end and a middle region therebetween, said optics mount having in inner sidewall defining a hollow inner pathway from said first end, through said middle region, and to said second end, said inner sidewall having a circular cross-section at each of said first and second ends and said middle region, said optics mount having a longitudinal axis extending along a longitudinal direction of said housing through said circular cross-sections at said first and second ends and said middle region,
   an optical element comprising material that is optically transparent to infrared light, visible light, or both such that said optical element is transparent to infrared light, visible light, or both, said transparent optical element disposed in said optics mount, said transparent optical element having a circular perimeter that fits within said optics mount against said inner sidewall, the transparent optical element contacting the optics mount at an interface between said circular perimeter of said transparent optical element and said inner sidewall of said optics mount having circular cross-section such that the optical element is held securely in the optics mount, wherein at the interface, the optically transparent material is in direct contact with the first material and adheres thereto; and
   an optical aperture comprising an opaque sheet having a perimeter sufficiently small to fit within said optics mount and an opening located in said opaque sheet for light to pass,
   wherein the optical aperture is secured in fixed position with respect to said optics mount and said transparent optical element on one side of said transparent optical element that is closer to one of said first or second ends than said other side of said first transparent optical element and such that said longitudinal axis passes through said hole in said optical aperture.

2. The integrated optical assembly of Example 1, wherein opaque material comprising said optics mount comprises at least one of aluminum, magnesium, or stainless steel.

3. The integrated optical assembly of Example 1 or 2, wherein said first transparent optical element is disposed in said middle region of said optical mount.

4. The integrated optical assembly of any of Examples 1 to 3, wherein the circular cross-section at said middle region is smaller than said circular cross-section at said first and second ends.

5. The integrated optical assembly of any of Examples 1 to 4, wherein the transparent optical element comprises a lens or a window.

6. The integrated optical assembly of any of Examples 1 to 5, wherein the transparent optical element comprises a lens having at least one side comprising:
   a region having an optical power disposed along the longitudinal axis, and
   a planar region between the optics mount and the region having the optical power,
wherein the optical aperture is secured adjacent to and substantially parallel to the planar region of said at least one side of said lens.

7. The integrated optical assembly of any of Examples 1 to 6, wherein the transparent optical element is transparent to infrared light and not transparent to visible light.

8. The integrated optical assembly of any of Examples 1 to 7, wherein the transparent material comprises chalcogenide glass.

9. The integrated optical assembly of any of Examples 1 to 8, wherein at the interface, the optically transparent material is directly adhered to the opaque material of said optics mount with no additional adhesive material therebetween.

10. The integrated optical assembly of any of Examples 1 to 9, wherein said transparent optical element protrudes from either or both said first or second ends of said optics mount.

11. The integrated optical assembly of any of Examples 1 to 10, wherein opaque sheet comprises material that is opaque to infrared or visible wavebands transmitted by the optically transmissive material comprising said optical element.

12. An integrated optical assembly comprising:
   an optics mount comprising an opaque material, said optics mount being tubular in shape and having a first end and a second end and a middle region therebetween, said optics mount having an inner sidewall defining a hollow inner pathway from said first end, through said middle region, and to said second end, said inner sidewall having a cross-section at each of said first and second ends and said middle region, said optics mount having a longitudinal axis extending along a longitudinal direction of said housing through said cross-sections at said first and second ends and said middle region,
   a first optical element comprising material that is optically transparent to infrared light, visible light, or both such that said first optical element is transparent to infrared light, visible light, or both, said first transparent optical element disposed in said optics mount, said first transparent optical element having a perimeter that fits within said optics mount against said inner sidewall, the first transparent optical element contacting the optics mount at an interface between the perimeter of said first transparent optical element and the inner sidewall of said optics mount such that the optical element is held securely in the optics mount, wherein at the interface, the optically transparent material is in direct contact with the first material and adheres thereto; and
   a second optical element having a perimeter sufficiently small to fit within said optics mount, said second optical element configured to permit said light to pass,
wherein the second optical element is secured in fixed position with respect to said optics mount and said first transparent optical element on one side of said first transparent optical element that is closer to one of said first or second ends than said other side of said first transparent optical element and such that said central longitudinal axis passes through said second optical element.

13. The integrated optical assembly of Example 12, wherein the cross-section of said inner sidewall of said optical mount is circular.

14. The integrated optical assembly of Example 12, wherein the cross-section of said inner sidewall of said optical mount is elliptical or rectangular.

15. The integrated optical assembly of any of Examples 12 to 14, wherein opaque material comprising said optics mount comprises at least one of aluminum, magnesium, or stainless steel.

16. The integrated optical assembly of any of Examples 12 to 15, wherein optics mount has a length between about 0.5 mm and 50 mm.

17. The integrated optical assembly of any of Examples 12 to 16, wherein the cross-section at said middle region is smaller than said cross-section at said first and second ends.

18. The integrated optical assembly of any of Examples 12 to 17, wherein the first transparent optical element comprises a lens or a window.

19. The integrated optical assembly of any of Examples 12 to 18, wherein the first transparent optical element comprises a plano-convex or plano-concave lens.

20. The integrated optical assembly of any of Examples 12 to 18, wherein the first transparent optical element comprises a biconcave, biconvex, or meniscus lens.

21. The integrated optical assembly of any of Examples 12 to 20, wherein the first transparent optical element comprises a freeform lens.

22. The integrated optical assembly of any of Examples 12 to 21, wherein the first transparent optical element has a circular perimeter.

23. The integrated optical assembly of any of Examples 12 to 22, wherein said the first transparent optical element comprises a lens having at least one side comprising:
   a region having an optical power disposed along the longitudinal axis, and
   a planar region between the optics mount and the region having the optical power,
wherein the second optical element is secured adjacent to and substantially parallel to the planar region of said at least one side of said lens.

24. The integrated optical assembly of any of Examples 12 to 23, wherein the first transparent optical element is transparent to infrared light and not transparent to visible light.

25. The integrated optical assembly of any of Examples 12 to 24, wherein the transparent material comprises chalcogenide glass.

26. The integrated optical assembly of any of Examples 12 to 25, wherein the transparent material comprising said first transparent optical element comprises glass.

27. The integrated optical assembly of any of Examples 12 to 26, wherein at the interface, the optically transparent material is adhered directly to the opaque material of said optics mount with no additional adhesive material therebetween.

28. The integrated optical assembly of any of Examples 12 to 27, wherein said first transparent optical element protrudes from either or both said first or second ends of said optics mount.

29. The integrated optical assembly of any of Examples 12 to 28, wherein said material comprising said first transparent optical element protrudes from either or both said first or second ends of said optics mount.

30. The integrated optical assembly of any of Examples 12 to 29, wherein said first transparent optical element is disposed in said middle region of said optics mount.

31. The integrated optical assembly of any of Examples 12 to 30, wherein the second optical element comprises an optical aperture.

32. The integrated optical assembly of Example 31, wherein the optical aperture comprises an opaque sheet having a hole centrally located in said opaque sheet for light to pass.

33. The integrated optical assembly of Example 31 or 32, wherein the opaque sheet of said optical aperture has a thickness between about 0.005 mm and 5 mm.

34. The integrated optical assembly of any of Examples 31 to 33, wherein the opaque sheet comprises material that blocks one or more infrared or visible wavebands transmitted by said optical material comprising said first transparent optical element.

35. The integrated optical assembly of Example of any of Examples 31 to 34, wherein the optical aperture comprises a stamped aperture.

36. The integrated optical assembly of any of Examples 12 to 35, wherein the first optical element comprises a molded element and said first optical element is molded from the optically transparent material in said optics mount.

37. The integrated optical assembly of Example 36, wherein the first optical element is adhered to the optics mount as a result of being molded from the optically transparent material.

38. The integrated optical assembly of any of Examples 12 to 37, wherein the first optical element is formed in said optics mount.

39. The integrated optical assembly of any of Examples 12 to 38, wherein the optical aperture is secured in position with respect to said optics mount and said first optical element after the first optical element is formed in the optics mount.

40. The integrated optical assembly of any of Examples 12 to 39, wherein the interface between the optical material and the optical mount is free of bonding agents.

41. The integrated optical assembly of any of Examples 12 to 40, wherein the integrated optical assembly is free of retaining elements that are separate from but connected to the optics mount to hold the first transparent optical element in place relative to the optics mount.

42. The integrated optical assembly of any of Examples 12 to 41, wherein the interface forms a hermetic seal.

43. The integrated optical assembly of any of Examples 12 to 42, wherein the interface sustains a pressure differential on opposite sides of the first transparent optical element of 1 atmosphere without leakage.

44. The integrated optical assembly of any of Examples 12 to 43, wherein the interface sustains a pressure differential on opposite sides of the first transparent optical element of 5 atmosphere without leakage.

45. The integrated optical assembly of any of Examples 12 to 44, wherein the interface sustains a pressure differential on opposite sides of the first transparent optical element of 10 atmosphere without leakage.

46. The integrated optical assembly of any of Examples 12 to 45, wherein the interface sustains a pressure differential on opposite sides of the first transparent optical element of 15 atmosphere without leakage.

47. The integrated optical assembly of any of Examples 12 to 46, wherein the transparent material comprises glass having a glass transition temperature, $T_g$, and wherein at the interface, opposing forces are exerted between the first transparent optical element and optics mount at temperatures below $T_g$.

48. The integrated optical assembly of any of Examples 12 to 47, wherein the second optical element is adhered to the optics mount with an adhesive contacting respective surfaces of the second optical element and the optics mount.

49. The integrated optical assembly of Example 48, wherein said adhesive comprises epoxy.

50. The integrated optical assembly of any of Examples 12 to 49, wherein the second optical element is adhered to the first transparent optical element with an adhesive contacting respective surfaces of the second optical element and the first transparent optical element.

51. The integrated optical assembly of Example 50, wherein said adhesive comprises a self-adhesive.

52. The integrated optical assembly of any of Examples 12 to 51, wherein the second optical element is adhered to the optics mount with a weld between respective surfaces of the second optical element and the optics mount.

53. The integrated optical assembly of Example 52, wherein said weld is between a surface on the opaque sheet comprising said second optical element and the inner sidewall of said optics mount.

54. The integrated optical assembly of Example 52 or 53, wherein said weld comprises a spot weld.

55. The integrated optical assembly of any of Examples 12 to 54, wherein the second optical element is spring-loaded to secure the optical aperture in fixed position with respect to said optics mount and said first transparent optical element.

56. The integrated optical assembly of Example 55, wherein the second optical element comprises one or more tabs bent to provide said spring-loading.

57. The integrated optical assembly of Example 55 or 56, wherein said one or more tabs has an end disposed away from said hole in said second optical element that is bent away from said first transparent optical element.

58. The integrated optical assembly of Example 56 or 57, wherein said one or more tabs comprises a plurality of tabs.

59. The integrated optical assembly of any of Examples 56 to 58, wherein said one or more tabs comprises at least three tabs.

60. The integrated optical assembly of any Examples 56 to 59, wherein said optics mount includes a groove in said inner sidewall configured to receive said one or more tabs.

61. The integrated optical assembly of any of Examples 12 to 60, wherein the second optical element comprises a plurality of tabs extending therefrom and said optics mount includes a lip that provides a groove in which said plurality of tabs fit to secure said the second optical element in fixed position with respect to said optics mount and said first transparent optical element.

62. The integrated optical assembly of Example 61, wherein said lip includes a plurality of slots that provide access for said tabs to said groove.

63. The integrated optical assembly of Example 62, wherein said second optical element is configured to rotate in said groove such that said tabs can fit through said slots and the second optical element is rotated so said tabs are rotated away from said slots.

64. The integrated optical assembly of any of Examples 12 to 63, wherein said opaque sheet includes at least one feature for contacting a tool to rotate said second optical element.

65. The integrated optical assembly of Example 64, wherein said at least one feature comprises a hole in said opaque sheet for receiving said tool.

66. The integrated optical assembly of Example 64, wherein said at least one feature comprises a plurality of holes in said opaque sheet for receiving said tool.

67. The integrated optical assembly of any of Examples 61-66, wherein the plurality of tabs are spring-loaded to secure the second optical element in fixed position with respect to said optics mount and said first transparent optical element.

68. The integrated optical assembly of Example 67, wherein the tabs are bent to provide said spring-loading.

69. The integrated optical assembly of Example 67 or 68, wherein said tabs have an end disposed away from said hole in said second optical element that is bent away from said first transparent optical element.

70. The integrated optical assembly of any of Examples 12 to 69, wherein said first transparent optical element comprises a plano-convex or plano-concave window or a planar optical element.

71. The integrated optical assembly of any of Examples 12 to 70, wherein said second optical element contacts a planar surface of said first transparent optical element.

72. The integrated optical assembly of any of the above Examples, wherein said optics mount includes threading on an outer surface.

73. The integrated optical assembly of any of the above Examples, wherein said optics mount includes one or more of the following: bolt patterns, counter bores, multiple external diameters, external threads, o-ring grooves, holes, pins, slots or grooves.

74. The integrated optical assembly of Example 73, attached to a housing via said threading on said optics mount.

75. The integrated optical assembly of any of the above Examples, attached to an optical component or system.

76. The integrated optical assembly of any of the above Examples, attached to a telescope, laser, fiber, or detector.

77. The integrated optical assembly of any of Examples 12 to 76, wherein said cross-section at each of said first and second ends and said middle region has a center and said longitudinal axis extends through said centers of said cross-sections.

78. The integrated optical assembly of any of Examples 12 to 77, wherein said longitudinal axis passes through said opening in said second optical element.

79. The integrated optical assembly of any of Examples 12 to 78, wherein said opening is centrally located in said optical element.

80. A method of fabricating an integrated optical assembly comprising:
    providing an optics mount comprising an opaque material, said optics mount being tubular in shape and having a first end and a second end and a middle region therebetween, said optics mount having an inner sidewall defining a hollow inner pathway from said first end, through said middle region, and to said second end, said inner sidewall having a cross-section at each of said first and second ends and said middle region, said optics mount having a longitudinal axis extending along a longitudinal direction of said housing through said cross-sections at said first and second ends and said middle region,
    forming a first optical element in said optics mount, said first optical element comprising material that is optically transparent to infrared light, visible light, or both such that said first optical element is transparent to infrared light, visible light, or both, said first transparent optical element disposed in said optics mount, said first transparent optical element having a perimeter that fits within said optics mount against said inner sidewall, the first transparent optical element contacting the optics mount at an interface between the perimeter of said first transparent optical element and the inner sidewall of said optics mount such that the optical element is held securely in the optics mount, wherein at the interface, the optically transparent material is in direct contact with the first material; and
    securing a second optical element in fixed position with respect to said optics mount and said first transparent optical element on one side of said first transparent optical element that is closer to one of said first or second ends than said other side of said first transparent optical element such that said central longitudinal axis passes through said second optical element, said second optical element configured to permit said light to pass.

81. The method of Example 80, wherein the cross-section of said inner sidewall of said optical mount is circular.

82. The method of Example 80, wherein the cross-section of said inner sidewall of said optical mount is elliptical or rectangular.

83. The method of any of Examples 80 to 82, wherein opaque material comprising said optics mount comprises at least one of aluminum, magnesium, or stainless steel.

84. The method of any of Examples 80 to 83, wherein optics mount has a length between about 0.5 mm and 50 mm.

85. The method of any of Examples 80 to 84, wherein the cross-section at said middle region is smaller than said cross-section at said first and second ends.

86. The method of any of Examples 80 to 85, wherein the first transparent optical element comprises a plano-convex or plano-concave lens.

87. The method of any of Examples 80 to 86, wherein the first transparent optical element comprises a biconcave, biconvex, or meniscus lens.

88. The method of any of Examples 80 to 87, wherein the first transparent optical element comprises a freeform lens.

89. The method of any of Examples 80 to 88, wherein the first transparent optical element comprises a lens or a window.

90. The method of any of Examples 80 to 89, wherein the first transparent optical element has a circular perimeter.

91. The method of any of Examples 80 to 90, wherein said the first transparent optical element comprises a lens having at least one side comprising:

a region having an optical power disposed along the longitudinal axis, and a planar region between the optics mount and the region having the optical power, wherein the second optical element is secured adjacent to and substantially parallel to the planar region of said at least one side of said lens.

92. The method of any of Examples 80 to 91, wherein the first transparent optical element is transparent to infrared light and not transparent to visible light.

93. The method of any of Examples 80 to 92, wherein the transparent material comprises chalcogenide glass.

94. The method of any of Examples 80 to 93, wherein the transparent material comprising said first transparent optical element comprises glass.

95. The method of any of Examples 80 to 94, wherein at the interface, the optically transparent material is adhered directly to the opaque material of said optics mount with no additional adhesive material therebetween.

96. The method of any of Examples 80 to 95, wherein said first transparent optical element protrudes from either or both said first or second ends of said optics mount.

97. The method of any of Examples 80 to 96, wherein said material comprising said first transparent optical element protrudes from either or both said first or second ends of said optics mount.

98. The method of any of Examples 80 to 97, wherein said first transparent optical element is disposed in said middle region of said optics mount.

99. The method of any of Examples 80 to 98, wherein the second optical element comprises an optical aperture.

100. The method of Example 99, wherein the optical aperture comprises an opaque sheet having a hole centrally located in said opaque sheet for light to pass.

101. The method of Example 100, wherein the opaque sheet of said optical aperture has a thickness between about 0.005 mm and 5 mm.

102. The method of Example 100 or 101, wherein opaque sheet comprises material that blocks one or more infrared or visible wavebands wavebands transmitted by said optical material comprising said first transparent optical element.

103. The method of any of Examples 99 to 102, wherein the optical aperture comprises a stamped aperture.

104. The method of any of Examples 80 to 103, wherein the first optical element is molded in said optics mount.

105. The method of Example 104, wherein said first optical element is molded from the optically transparent material in said optics mount.

106. The method of Example 104 or 105, wherein the first optical element is adhered to the optics mount as a result of being a molded from the optically transparent material.

107. The method of any of Examples 80 to 106, wherein the optical aperture is secured in position with respect to said optics mount and said first optical element after the first optical element is formed in the optics mount.

108. The method of any of Examples 80 to 107, wherein the interface between the optical material and the optical mount is free of bonding agents.

109. The method of any of Examples 80 to 108, wherein the integrated optical assembly is free of retaining elements that are separate from but connected to the optics mount to hold the first transparent optical element in place relative to the optics mount.

110. The method of any of Examples 80 to 109, wherein the interface forms a hermetic seal.

111. The method of any of Examples 80 to 110, wherein the interface sustains a pressure differential on opposite sides of the first transparent optical element of 1 atmosphere without leakage.

112. The method of any of Examples 80 to 111, wherein the interface sustains a pressure differential on opposite sides of the first transparent optical element of 5 atmosphere without leakage.

113. The method of any of Examples 80 to 112, wherein the interface sustains a pressure differential on opposite sides of the first transparent optical element of 10 atmosphere without leakage.

114. The method of any of Examples 80 to 113, wherein the interface sustains a pressure differential on opposite sides of the first transparent optical element of 15 atmosphere without leakage.

115. The method of any of Examples 80 to 114, wherein the transparent material comprises glass having a glass transition temperature, $T_g$, and wherein at the interface, opposing forces are exerted between the first transparent optical element and optics mount at temperatures below $T_g$.

116. The method of any of Examples 80 to 115, wherein the second optical element is adhered to the optics mount with an adhesive contacting respective surfaces of the second optical element and the optics mount.

117. The method of Example 116, wherein said adhesive comprises epoxy.

118. The method of any of Examples 80 to 117, wherein the second optical element is adhered to the first transparent optical element with an adhesive contacting respective surfaces of the second optical element and the first transparent optical element.

119. The method of Example 118, wherein said adhesive comprises a self-adhesive.

120. The method of any of Examples 80 to 119, wherein the second optical element is welded to the optics mount with a weld between respective surfaces of the second optical element and the optics mount.

121. The method of Example 120, wherein said weld is between a surface on the opaque sheet comprising said second optical element and the inner sidewall of said optics mount.

122. The method of Example 120 or 121, wherein said weld comprises a spot weld.

123. The method of any of Examples 80 to 122, wherein the second optical element is spring-loaded to secure the optical aperture in fixed position with respect to said optics mount and said first transparent optical element.

124. The method of Example 123, wherein the second optical element comprises one or more tabs bent to provide said spring-loading.

125. The method of Example 124, wherein said one or more tabs has an end disposed away from said hole in said second optical element that is said bent away from said first transparent optical element.

126. The method of Example 124 or 125, wherein said one or more tabs comprises a plurality of tabs.

127. The method of any of Examples 124 to 126, wherein said one or more tabs comprises at least three tabs.

128. The method of any Examples 124 to 127, wherein said optics mount includes a groove in said inner sidewall configured to receive said one or more tab.

129. The method of any of Examples 80 to 128, wherein the second optical element comprises a plurality of tabs extending therefrom and said optics mount includes a lip that provides a groove in which said plurality of tabs fit to secure said the second optical element in fixed position with respect to said optics mount and said first transparent optical element.

130. The method of Example 129, wherein said lip includes a plurality of slots that provide access for said tabs to said groove.

131. The method of Example 130, wherein said tabs are fit through said slots and the second optical element is rotated in said groove so said tabs are rotated away from said slots.

132. The method of any of Examples 129 to 131, wherein said opaque sheet includes at least one feature for contacting a tool to rotate said second optical element.

133. The method of Example 132, wherein said at least one feature comprises a hole in said opaque sheet for receiving said tool.

134. The method of Example 132, wherein said at least one feature comprises a plurality of holes in said opaque sheet for receiving said tool.

135. The method of any of Examples 129 to 134, wherein the plurality of tabs are spring-loaded to secure the second optical element in fixed position with respect to said optics mount and said first transparent optical element.

136. The method of Example 135, wherein the tabs are bent to provide said spring-loading.

137. The method any of Examples 129 to 136, wherein said tabs have an end disposed away from said hole in said second optical element that is bent away from said first transparent optical element.

138. The method of any of Examples 80 to 137, wherein said first transparent optical element comprises a plano-convex or plano-concave window or a planar optical element.

139. The method of any of Examples 80 to 138, wherein said second optical element contacts a planar surface of said first transparent optical element.

140. The method of any of Examples 80 to 139, wherein said optics mount includes threading on an outer surface.

141. The method of any of Examples 80 to 140, wherein said optics mount includes one or more of the following: bolt patterns, counter bores, multiple external diameters, external threads, o-ring grooves, holes, pins, slots or grooves.

142. The method of Example 140, further comprising attaching said integrated optical assembly to a housing via said threading on said optics mount.

143. The integrated optical assembly of any of Examples 80 to 142, further comprising attaching said integrated optical assembly to an optical component or system.

144. The method of any of Examples 80 to 143, further comprising attaching said integrated optical assembly to a telescope, laser, fiber, or detector.

145. The method of any of Examples 80 to 144, wherein said cross-section at each of said first and second ends and said middle region has a center and said longitudinal axis extends through said centers of said cross-sections.

146. The method of any of Examples 80 to 145, wherein said longitudinal axis passes through said opening in said second optical element.

147. The method of any of Examples 80 to 146, wherein said opening is centrally located in said optical element.

148. The method of any of Examples 80 to 147, wherein said second optical element has a perimeter sufficiently small to fit within said optics mount.

149. The method of any of Examples 80 to 148, wherein said second optical element is inserted into said optics mount.

150. The method of any of Examples 80 to 149, wherein optically transparent material is introduced into said optics mount to form said first optical element.

151. The method of any of Examples 80 to 150, wherein said optically transparent material is heated sufficiently high to be melted.

152. The method any of Examples 80 to 151, wherein at least one mold is pressed against said optically transparent material to form said first optical element in said optics mount.

153. The method any of Examples 80 to 152, wherein said optically transparent material is cooled to form said first optical element in said optics mount.

154. The integrated optical assembly or method of any of the examples above, wherein the first optical element includes a spectral coating thereon that comprises a spectral filter.

155. The integrated optical assembly or method of any of the examples above, wherein the optical element includes a spectral coating thereon that blocks certain wavelengths.

156. The integrated optical assembly or method of any of the examples above, wherein the first transparent optical element includes a spectral coating thereon that comprises a spectral filter.

157. The integrated optical assembly or method of any of the examples above, wherein the first transparent optical element includes a spectral coating thereon that blocks certain wavelengths.

BRIEF DESCRIPTION OF THE DRAWINGS

FIGS. 8A-8D illustrate another example integrated optical assembly comprising an additional optical element such as an optical aperture including spring elements configured to fit into slots in the optical mount such that the optical aperture can be rotated and locked into position with the assistance of spring loading.

DETAILED DESCRIPTION

Figure 1:
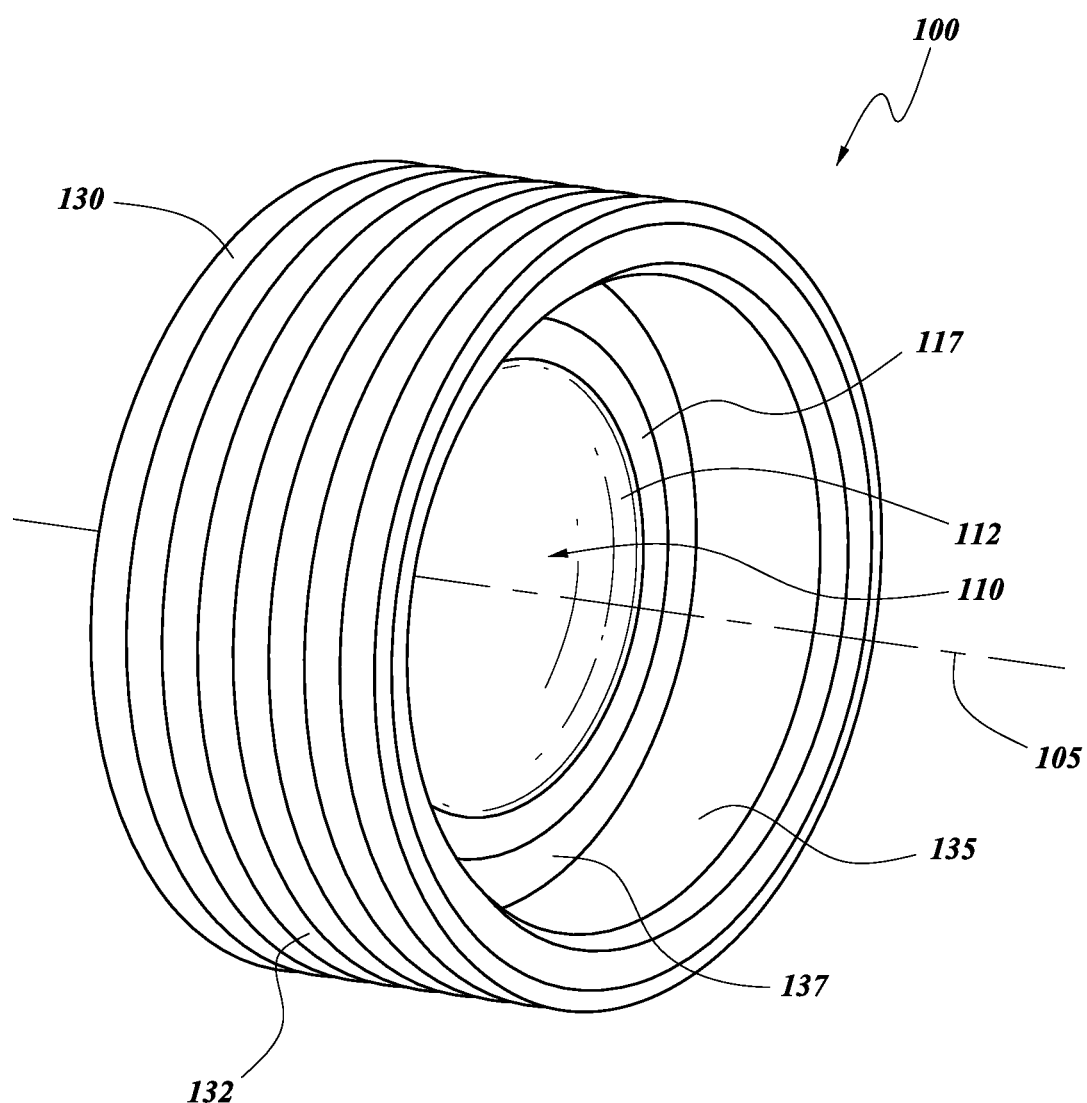
FIG. 1 is a perspective view of an example integrated optical assembly comprising an optical element such as a lens that is transparent to visible and/or infrared (IR) wavelength light disposed in an optical mount.

Various embodiments disclosed in the present application are directed to an integrated optical assembly comprising an optical element (first optical element) such as a lens that is substantially optically transmissive or transparent to visible and/or infrared (IR) light that is simultaneously formed and integrated in a mechanical part such as an optics mount. In some embodiments, the mechanical part, e.g., optics mount, lens holder, etc., is configured to facilitate the mounting or inclusion of the transparent optical element (e.g., lens) into a higher level optical system. The integrated optical assembly may also include an additional optical element (second optical element), such as for example, an aperture stop, polarizer, or other optical elements. The additional (second) optical element may be secured into position relative to the (first) transparent optical element and optics mount by a securing structure. The additional (second) optical element is secured after the transparent optical element is simultaneously formed and integrated into the optics mount. As discussed above, the first transparent optical element may be designed to propagate IR electromagnetic radiation or IR light. The first transparent optical element may comprise a lens having one or more spherical, aspheric, diffractive, and/or planar surfaces. Accordingly, such surfaces may have optical power. The first transparent optical element also comprising a window having a pair of (e.g., front and back) plano surfaces.

In some implementations, a transparent optical element such as the first optical element may be integrated with an optics mount (or mechanical part) simultaneously during a process of molding the transparent optical element to form a single integrated optical assembly comprising the transparent optical element and the optics mount. The transparent optical element may be directly adhered to and thereby integrated with the optics mount during the molding process. In some cases, the transparent optical element adheres to a surface of the optical mount without an adhesive therebetween. In some implementations, a surface of the optics mount may comprise an interference fit configured to ensure the optical element is held in place after completion of the molding process. The interference fit may be substantially free of materials other than the transparent optical element and the optics mount. For example, a mold-in-place (MIP) process may be implemented for forming the transparent optical element and integrating the transparent optical element into a mechanical structure such as a tubular housing to form the integrated optical assembly.

Integrating the transparent optical element into the optics mount may be dependent on the physical properties of the respective materials, particularly in implementations where the transparent optical element is an IR optical element. For example, the material of the IR optical element may be specifically selected based on the material of the optics mount, and/or vice versa, in order to produce the integrated optical assembly. Without subscribing to a particular scientific theory, matching of the materials can facilitate successful molding of the lens and integration with the optical mount and provide the integrated assembly with a useful performance over a range of environmental conditions (e.g., temperatures) in which the assembly will be used. The molding process may further provide a hermetic seal and/or environmental seal for the next higher level assembly. The higher level assembly may include one or more components associated with a telescope, a laser, laser system and imaging sensor/system or other type of system or system and may include a detector, fiber, sensor and/or other optical component(s).

One non-limiting advantage of integrating the transparent optical element such as a lens with the optics mount as part of the forming or molding process of the transparent optical element is that a need for bonding or affixing the transparent optical element to the optical mount with an auxiliary mechanical component such as a retainer (e.g. retainer ring) may be reduced or eliminated. Accordingly, the mold-in-place process for forming the transparent optical element, e.g., lens, may remove a need for additional or extras parts configured for retaining and securing the transparent optical element to the optical mount. Furthermore, the mold-in-place process of forming the transparent optical element such as the lens in the optical mount may create a hermetic seal or environmental seal between the transparent optical element and the optics mount that may also remove or reduce the need to add a sealing feature (e.g., a gasket) at the interface between the optical element and the optics mount.

As discussed above, an additional (second) optical element may be included in the integrated optical assembly. An example of such an additional optical element is an optical aperture. For some applications, for example, integrated optical assemblies and higher level optical systems are designed for use with light sources having a broad angular or spatial extent (e.g., a larger field-of-view (FOV)). These optical systems may benefit from the use of a mechanical aperture stop. In some lens systems, for example, the aperture stop may block unintended or stray light from propagating through the optical assembly or system. The aperture stop may also define an entrance pupil of the optical assembly or system, or the extent over which the lens accepts light from the object or scene to be imaged. The aperture size and placement may be selected in the design of the optical assembly and overall optical system. For example, the aperture stop may be designed to affect aspects of the performance of the optical assembly or system such as power throughput and illumination, f-number, numerical aperture, resolution, diffraction limited spot size, modulation transfer function (MTF), aberrations, stray light background noise or any combination thereof.

Accordingly, the present disclosure describes examples of integrated optical assemblies comprising an additional (second) optical element that may be configured to interact with or manipulate light. As discussed above, this additional optical element may comprise an optical aperture. The optical aperture may comprise material opaque to light having wavelength transmitted by the transparent optical element. The optical aperture may have an opening in the opaque material for passage of light. The optical aperture may comprise, for example, a sheet of opaque material such as metal having an opening therein. In some embodiments, the additional optical element, such as an optical aperture, may be manufactured through a stamping process. This stamping process may be highly repeatable with little variation in manufactured tolerances. While the present disclosure references an aperture stop as an example optical element, the assemblies, systems, and methods disclosed herein may be implemented using other optical elements such as other optical elements configured to interact with or affect light propagating through integrated optical element and and or the optical element.

One non-limiting advantage of various assemblies and methods of manufacture disclosed herein is that the integrated optical assemblies may be less expensive and/or simpler to manufacture as compared to other designs and methods. In some cases, the number of steps for manufacturing an integrated optical assembly may be reduced which decreases the overall costs. For example, in one embodiment the manufacturing process may include manufacturing the optics mount, simultaneously form and integrate the optical element into the optics mount, and insert the aperture. The manufacturing process may optionally include coating the optical element either before or after inserting the aperture. In various embodiments, the integrated optical assembly may then be tested to determine whether it performs within the desired tolerances. Reducing the number and complexity of the steps for manufacturing the integrated optical assembly may result in an increase in yield.

Another non-limiting advantage is that the second optical element (e.g., the aperture) can be aligned with first transparent optical element with improved accuracy and precision. Various methods disclosed herein, for example, reduce the sources of error through reduction in the number of the steps and the dependency on human operator, thus the optical element and the optics mount may be aligned within more precise and tighter tolerances.

Reference will not be made to the figures, in which like reference numerals refer to like parts throughout.

Example Integrated Optical Assembly

FIG. 1 is a perspective view of an example integrated optical assembly 100. The integrated optical assembly comprises a mechanical part such as an optics mount 130 and an optical element 110 transparent to IR and over visible light. The optical mount may comprise for example metal and may be fabricated by machining, for example, milling, lathing, etc. The transparent optical element may comprise material that is optically transmissive to infrared and/or visible light. Such material may include chalcogenide glass. The transparent optical element may be formed by molding. In some implementations, the integrated optical assembly may be formed by a mold-in-place (MIP) process, for example, as described in connection to FIGS. 2A and 2B. The process may result in a single integrated optical assembly 100 where the transparent optical element 110 is simultaneously formed and affixed to or attached to the optics mount 130. As illustrated in FIG. 1, the optics mount 130 may be positioned surrounding the transparent optical element 110 and aligned along an optical axis 105 associated with the transparent optical element 110. In some embodiments, the transparent optical element 110 and/or optical assembly 100 may be configured to propagate light in the IR spectrum (and possibly not in the visible spectrum).

Figure 2A:
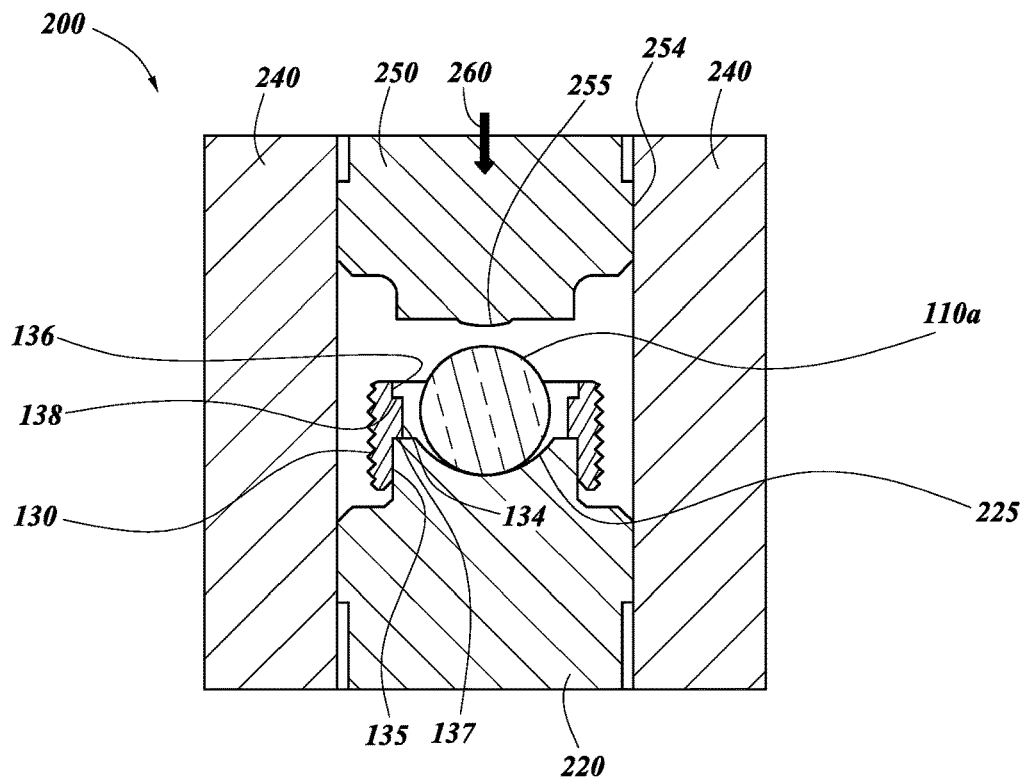
FIGS. 2A and 2B are cross-sectional views schematically depicting an example process for fabricating the integrated optical assembly of FIG. 1.
Figure 2B:
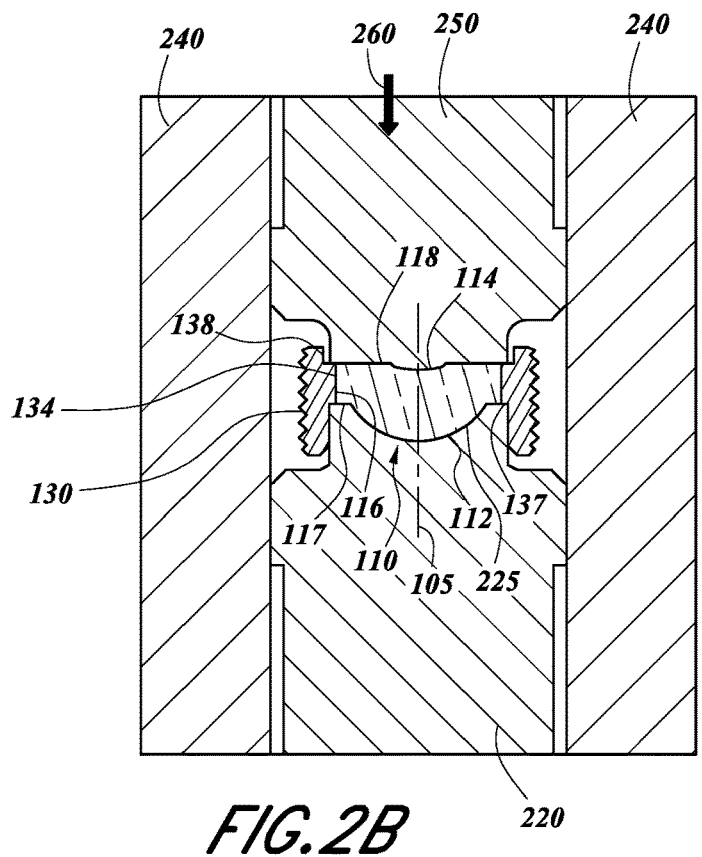

The transparent optical element 110 may be a lens comprising two optical surfaces 112 and 114 (as shown in FIG. 2B) surrounded by substantially planar portions 117 and 118, respectively. These planar portions 117 and 118 may be annular or ring-like portions in some designs although these portions 117 and 118 need not be restricted to annular or ring-like. The optical surfaces 112 and 114 may be spherical, aspheric, diffractive, and/or planar surfaces. Either or both of these surface 112 and 114 may be curved and may have optical power defined by the curvature of the surface. As illustrated in FIGS. 1 and 2B, the optical surface 112 may be convex having a spherical or aspheric surface. Optical surface 114 is illustrated in FIG. 2B as concave surrounded by a planar portion 118. Either or both the optical surfaces 112 and 114 may be shaped differently. For example, the optical surface 112 may be concave and/or the optical surface 114 may be convex. Either surface 112, 114 may also be planar. In some embodiments, the optical surfaces 112 and 114 may both be planar surfaces and the transparent optical element 110 may comprise an optical window. The transparent optical element may have a circular cross-section and perimeter although other cross-sectional shapes (e.g., elliptical, rectangular, etc.) are possible. The optical elements may be made of materials (e.g., glass, plastics, etc.) selected to pass, direct, propagate, and/or generally manipulate IR and/or visible light incident thereon. While the optical element shown in FIGS. 1 and 2B as well as any optical element shown in other Figures and/or described herein are made with reference to specific example transparent optical elements 110, the transparent optical element may be different and have different shape or size or be a different type of optical element (e.g., may have any surface curvature or shape). For example, the optical element 110 may be configured to pass, direct, propagate, and/or manipulate light of any portion of the electromagnetic spectrum (e.g., visible, IR, ultra-violet, etc.). The planar portions 117 and 118 may interface with and/or be attached to the optics mount 130 as shown in FIGS. 1 and 2B.

The optics mount 130 may be tubular in shape and have a first end and a second end and a middle region therebetween. The tubular shaped optical mount 130 may have a hollow inner pathway from the first end, through the middle region, and to the second end, with an inner sidewall 134 having a circular cross-section although other cross-sectional shapes (e.g., elliptical, rectangular, etc.) are possible. The optics mount 130 may generally surround the transparent optical element 110, which may be located, in some designs, in the middle region of the optics mount. The inner sidewall 134 may form an interface surface with a perimeter of the transparent optical element. In some designs, both the transparent optical element and the inner sidewall 135 have similar shaped cross-sections such as circular cross-sections. In some embodiments, the interface surface 134 comprises an interference fit with an outer perimeter or circumference surface 116 of the transparent optical element 110 and is configured such that the transparent optical element 110 is held in place following completion of the molding process. With subscribing to any scientific theories, the interference fit, for example may be caused by the CTE of the transparent optical element being different (e.g., smaller) than the CTE of the optical mount 130. When the material forming the transparent optical element 110 and the material forming the optical mount 130 cool off after being heated to mold the transparent optical element, the optical mount may contract more than the material comprising the transparent optical element and may cause the inner sidewall 134 of the optical mount to be compressed against the perimeter of the transparent optical element. Such a configuration can cause the lens to be held securely in the holder over a range of temperatures. With subscribing to any scientific theories, molding the material comprising the transparent optical element 110 in the optical mount 130 also or alternatively may possibly cause the cooled transparent material to adhere to the material forming the optical mount. Accordingly, during the molding process of the optical element 110, the material of the optical element 110 may be molded so that outer circumference surface 116 interlocks with and/or fuses with the interface surface 134. While FIGS. 1 and 2B illustrate the optics mount 130 as completely surrounding the optical element 110, other configurations are possible. For example, the optics mount 130 may be configured to partially surround the optical element 110. Furthermore, the optics mount 130 may be attached to the optical element at a plurality of discrete positions around the circumference of the optical element, e.g., 2, 3, 4, etc. points of contact between the outer circumference surface 116 and the inner side surface 134. In various designs, the lens can be molded in the optical mount when the optical mount 130 only partially surrounds the lens, for example, when the optical mount surrounds the lens over at least 200° but less than 360° around the lens. The optical mount may surround the lens by 200° but less than 240°, 240° but less than 280°, 280° but less than 320°, or 320° but less than 360° or any range defined by any of the values as well as possibly values outside these ranges. Any configuration is possible so long the optics mount 130 is configured to support, hold, and/or manipulate the optical element 110 as desired.

As discussed above, the optics mount 130 comprises a hollow inner pathway or borehole that is shown in FIG. 1 extending toward the optical element 110. For example, FIG. 1 illustrates a borehole (e.g., counter bore) defined at the first end of the optical mount 130 by inner sidewall surface 135 having circular cross-section and a bore diameter. The borehole extends inward toward the optical element 110. The optics mount 130 includes a lip, rim, or surface 137. This surface 137 may be substantially parallel with the planar portion 117 of the optical element 110. This surface 137 may correspond to a stop or a ledge that contacts a surface used to mold the optical mount 130. The planar portion 117 of the transparent optical element 110 may be formed by contact of mold surface with this ledge 137. Similarly, the borehole may also be on the opposite side of the optical element 110 as illustrated in FIG. 2B. For example, FIG. 2B illustrates the borehole (e.g., counter bore) defined at the second end of the optical mount 130 by inner sidewall surface 136 having circular cross-section and a bore diameter. The bore diameter may be the distance between a longitudinal axis 105 going through the center of the borehole and the surface inner sidewall surface 136. The optics mount 130 includes a lip, rim or surface 138 similar to the surface 137 on the other side of the optical element. The surface 138 may be substantially parallel to the planar portion 118 of the optical element 110. This surface 138 may correspond to a stop or a ledge that contacts a surface used to mold the optical mount 130. The planar portion 118 of the transparent optical element 110 may be formed by contact of mold surface with this ledge 138.

The optics mount 130 may also comprise one or more features 132 configured to facilitate the insertion of the integrated optical assembly 100 into a portion of a higher level optical system (not shown) or connection of the integrated optical assembly with a higher level optical system. For example, the optics mount 130 may be a lens holder or other part configured to mechanically interface with other components of a higher level optical system. FIG. 1 depicts the feature 132 as threading configured to allow the integrated optical assembly to be inserted or interconnected, via a screwing motion, into a portion of the higher level assembly. In some embodiments, the pitch of the threading may be indicative of a fine tune adjustment or alignment of the integrated optical assembly 100 within the higher level optical system.

In some embodiments, the feature 132 may be difficult to or cannot be formed as part of the transparent optical element 110. While a single feature 132 is illustrated in FIG. 1 as threading, the feature 132 need not be so limited and other configurations are possible. The feature 132 may also comprise one or more bolt patterns, counter bores, multiple external diameters, external threads, o-ring grooves, holes, pins, slots, grooves, boreholes, or other types of fasteners. For example, the feature 132 may be slots or protrusions configured to slide into a higher level assembly. Furthermore, the feature 132 may comprise clips or snapping features to lock the integrated optical assembly 100 into the higher level assembly. A wide variety of feature 132 may be implemented to insert, attach, align, or otherwise integrate the integrated optical assembly 100 into a higher level assembly. One or more of these example features 132 may be configured to interface with parts of a higher level optical system to mount, displace, translate, focus, tilt, adjust, engage a mating part, engage a tool, or precisely align the optical element 110 with the higher level optical system.

In some designs, the optics mount 130 may also be configured to mount and seal to an o-ring, gasket or other type of sealing element. For example, resilient element such as an o-ring, gasket, spring, adjustable element, or the like may be disposed in contact with optical mount 130, for example, the surface 137 or surface 138, for positioning the integrated optical assembly 100 relative to the higher level system. In some embodiments, as shown in FIGS. 1 and 2B, the surface 137 may be positioned at substantially the same plane as the planar surface 117 of the optical element 110. In another embodiment, the surface 117 may be away from the planar surface 117 of the optical element 110, for example, positioned between the optical element 110 and the edge of the optics mount 130. The optics mount 130 may also be configured to protect the optical element from damage during handling and impacts. For example, by extending beyond the optically transmissive material (e.g., glass) comprising the optical element 110, the housing 130 can provide protection to the optically transmissive material (e.g., glass) during handling.

As described above, the material comprising of the transparent optical element 110 and optics mount 130 may be selected based on the physical properties of the respective materials. The material of the optical element 110 may have an associated physical property (e.g., CTE) defining how the material may change its physical shape or properties based on changes in the environment. In various embodiments, the selection of the materials for the optical element 110 and the optics mount 130 may be dependent on matching, reducing, or minimizing the relative differences of these physical properties. For example, the material of the optics mount 130 may be selected based on the CTE of the material used to form the optical element 110. In some embodiments, the physical properties including the CTE of the materials used to form the optics mount 130 are matched to the material of the optical element. One non-limiting advantage of matching or reducing the difference in the physical properties of the materials is that the optical element 110 may expand and contract due to temperature changes without bending, breaking, or modifying its optical performance. Also the coefficient of thermal expansion, CTE, of the material (e.g. metal) comprising the holder 130 can be slightly higher than the CTE of the material (e.g. glass) comprising the optical element 110. As a result, the holder 130 may contract more than the optical element when cooled and secure the optical element 110 firmly in place therein. This configuration may advantageous for maintaining the glass to metal interface over temperature changes.

In some embodiments, the transparent optical element 110 may be a material configured to be transparent and to transmit and possibly to refract IR light. Some example materials include, but are not limited to, glasses of alkali phosphate, alkali fluorophosphate, alkali aluminophosphate, alkali aluminofluorophosphate, and chalcogenide types. In some embodiments, the optics mount 130 may be made of a material including aluminum, magnesium, plastic, and/or stainless steel. Without subscribing to a particular scientific theory, matching of the materials may facilitate fabricating the integrated optical assembly 100. Additionally, suitable material selection may cause the integrated optical assembly to performs as designed over a range of environmental temperatures for the intended application. For example, in one embodiment, a useful but non-limiting range may be approximately −40° C. to approximately +115° C.

Example Process for Forming an Integrated Optical Assembly

FIGS. 2A and 2B are cross sectional views schematically depicting an example process for fabricating the transparent optical element 110 of FIG. 1. FIG. 2A illustrates a first stage of the example process comprising providing a volume of material 110a and the optics mount 130. FIG. 2B illustrates a second stage of the example process where molding of the transparent optical element 110 is completed. FIGS. 2A and 2B illustrate a device 200 configured to simultaneously form and integrate the transparent optical element 110 with the optics mount 130. In the embodiment illustrated in FIGS. 2A and 2B, the integrated optical assembly 100 and in particular the transparent optical element 110 may be formed through a mold-in-place (MIP) process. While the following description is made with reference to the integrated optical assembly 100 of FIG. 1 and the transparent optical element 110 shown therein, the process described herein may be applied to any moldable optical element of any shape and optical properties. Similarly, the optics mount 130 may be any optics mount having any of the features described herein as well as other possible features.

The device 200 for forming the integrated optical assembly 100 may comprise a first and second surface molds 220 and 250, respectively, encapsulated in a sleeve 240. The first and second molds 220 and 250 may be disposed along the center of the sleeve 240 and configured to be brought together, possibly, at a central region. Disposed at the center region are the optics mount 130 and the volume of material 110a. The sleeve 240 may be cylindrical having a hollow center 254 and my generally surround the first and second molds 220 and 250 so the maintain alignment of the molds 220 and 250 and permit translation of one or both molds with respect to (e.g., toward) the other.

The first and second molds 220 and 250 may be designed to have surfaces 225 and 255. Each surface 225 and 255 comprise a shape to be imparted onto the transparent optical element 110, as described herein. For example, surfaces 225 and 255 may have a surface specifically shaped to create the desired spherical, aspheric, or planar optical surface that matches the resulting optical surfaces 112 and 114, respectively, of the optical element 110. The surfaces 225 and 255 may be associated with respective sides of the transparent optical element 110. For example, surface 225 may be configured to form the first optical surface 112 and planar surface 117 and the surface 255 may be configured to form the second optical surface 114 and planar surface 118. Each surface 225 and 255 may be aligned with a central longitudinal axis or center axis of the sleeve 240 and aligned with the resulting central longitudinal axis of the integrated optical assembly 105 and/or the optical axis of the transparent optical element (e.g. lens) 110.

Referring to FIG. 2A, the volume of material 110a is a volume of raw material sufficient to form the optical element 110 having optical surfaces 112, 114 that correspond to the mold surfaces 225 and 255. In one example, the volume of material 110a is placed on one of the mold surfaces (e.g., mold surface 225 in FIG. 2A) and is generally surrounded by the optics mount 130. The mold 220 may be positioned with at least a portion being within the borehole of the optics mount 130 (e.g., in contact with ledge/surface 137 as illustrated in FIG. 2A). The second mold 250 is disposed opposite the first mold 220 within the sleeve 240. The amount of material included in the volume of material 110a is sufficient to fill the void between the molds 220 and 250 when they are brought together (e.g., when the first and second molds 220, 250 and mold surfaces 225, 255 contact the ledges/surfaces 137, 138, respectively of the optical mount 130). Furthermore, the amount of material in the volume of material 110a is sufficient to contact and potentially adhere to or fuse with the optics mount 130 at interface surface 134.

In various embodiments, the device 200 may be heated to a temperature beyond the transition temperature, $T_g$, of the volume of material 110a. For example, the device 200 is heated to a temperature such that the material 110a becomes pliable and moldable. Example temperatures for infrared glass include temperatures in the range of 185° C. to 365° C., however temperatures outside this range may be possible. In various cases, after the temperature of the device 200 is above the transition temperature, the second mold 250 is moved in a direction 260 toward the first mold 220 substantially along the longitudinal axis and/or optical axis 105. The second mold 250 may be translated such that at least a portion thereof is in the borehole of the optics mount 130. For example, the mold surface 255 may be brought into contact with surface 138. As the second mold 250 is moved toward the first mold 220 such that the mold surfaces 225 and 255 apply pressure to the pliable volume of material, and the optical surfaces 112 and 114 are formed so as to have a shape corresponding to the shapes of the mold surfaces 225 and 255, respectively.

In various embodiments, as the second surface 255 is pressed against the volume of material 110a, some of the volume of material 110a is pushed outward toward the interface surface 134. The pliable, moldable, and/or shapeable volume of material 110a thus is in contact and precisely matches the shape and possibly one or more surface characteristics of the interface surface 134. Accordingly, the volume of material 110a may be substantially matched to the interface surface 134, thereby facilitating adhering, bonding and/or fusing the resulting optical element 110 to the optics mount 130.

Referring now to FIG. 2B, a completed integrated optical assembly 100 is depicted encased in the molds 220 and 250. For example, the molds 220 and 250 may held in a final position, relative to each other, such the volume of material 110a corresponds to the final shape of transparent optical element 110. Once the second surface 255 has reached this position (e.g., the mold 250 and mold surface 255 may be positioned in contact with ledge/surface 138), the device 200 may be cooled or allowed to cool to a temperature below the transition temperature, $T_g$, of the volume of material 110a. While the material 110a cools, it may harden to form the more rigid molded optical element 110. As described above, the volume of material 110a also was permitted to interface with interface surface 134. Thus, once the volume of material 110a cools (e.g., to room temperature), the resulting optical element 110 is secured within the optics mount 130 via an interference fit and/or adhesion, bonding, or fusion. Once the mold assembly has cooled (e.g., to or proximal to room temperature or to another temperature below the glass transition temperature, $T_g$, or to a temperature where the material 110a is sufficiently hard so as not to further change shape upon touch, e.g., by an operator) the sleeve 240 and molds 220, 250 may be removed from the integrated optical assembly 100. Accordingly, the device 200 may be configured to simultaneously form and integrate the transparent optical element 110 with the optics mount 130.

While a FIGS. 2A and 2B describe an example process, this is for illustrative purposes only and other configurations and methods are possible. For example, both molds 220 and 250 may be moved toward the volume of material 110a to form the optical element 110. Other shapes and designs of the transparent optical element 110 and optics mount 130 are also possible. Accordingly, the molds 220, 250 and mold surfaces 225, 255 may be shaped differently.

Example Integrated Optical Assembly Including an Additional Element

In some instances, it may be desirable to attach one or more additional optical elements to an integrated optical assembly 100, such as the integrated optical assembly of FIG. 1. For example, in some of these cases, it may be beneficial to include an aperture stop integrated into the integrated optical assembly 100 and/or closely positioned with respect to the transparent optical element 110. An aperture stop may be useful, for example, for some higher level optical systems that include light sources having a broad angular or spatial extent. An aperture stop may be useful for other reasons as well.

While the following description in connection to FIGS. 3A-9 are made with reference to an optical element comprising an aperture stop, the disclosure is applicable to other types of elements. For example, in some implementations, it may be desirable to integrate beamsplitters, prisms, polarizers, additional lenses or windows, or other elements configured to receive, interact with and/or manipulate light with the integrated optical assembly 100. Furthermore, it may be desirable to attach two or more integrated optical assemblies, possibly to align the optical axes of the optical elements therein. For example, a first integrated optical assembly 100 may be supplied and a second integrated optical assembly having a transparent optical element with the same or different optical power and curvature as the transparent optical element in the first integrated optical assembly 100 may be attached to the first integrated optical assembly.

Figure 3A:
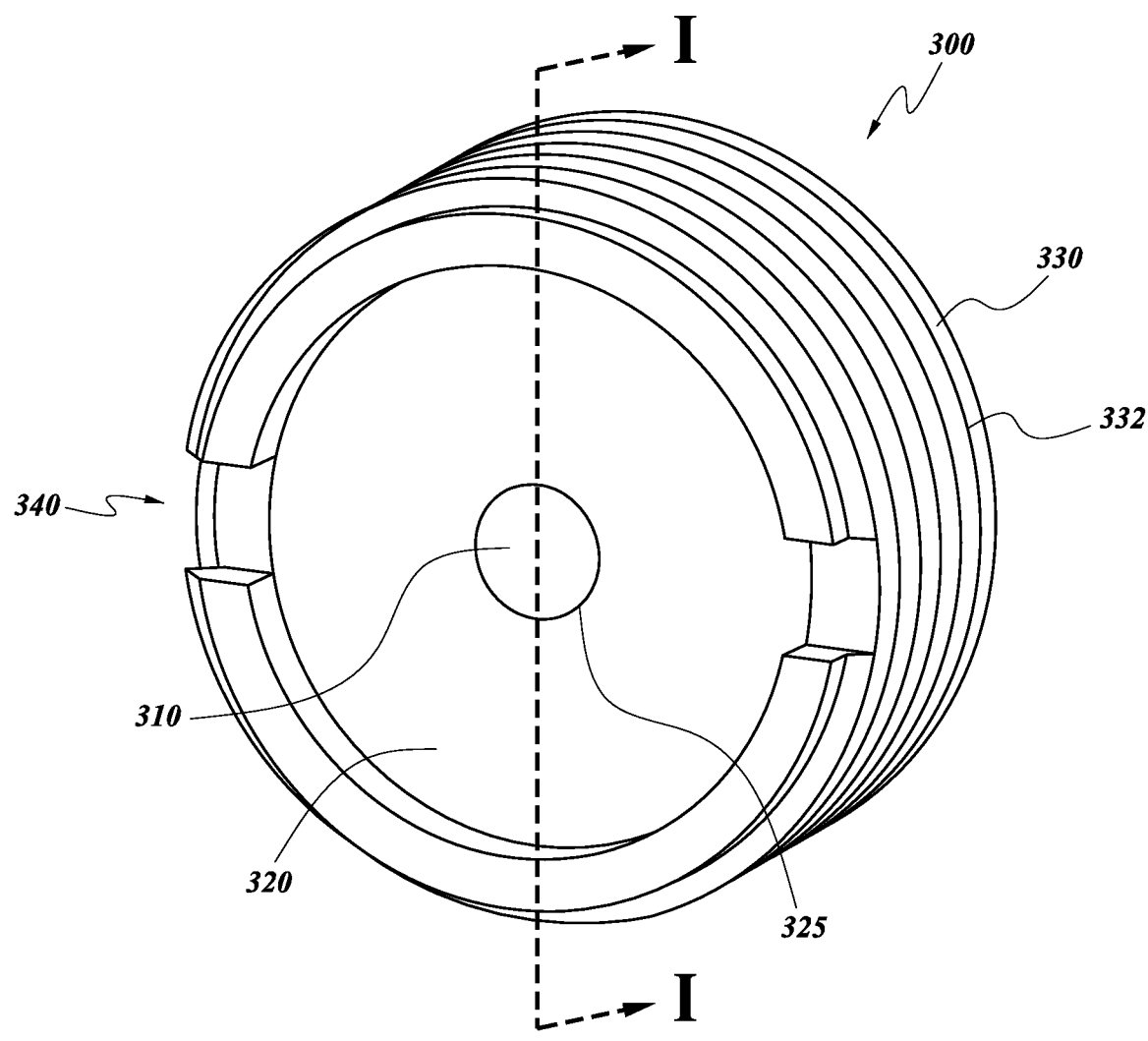
FIGS. 3A-3C illustrate an example integrated optical assembly comprising an additional optical element such as an optical aperture bonded to the optical mount.
Figure 3B:
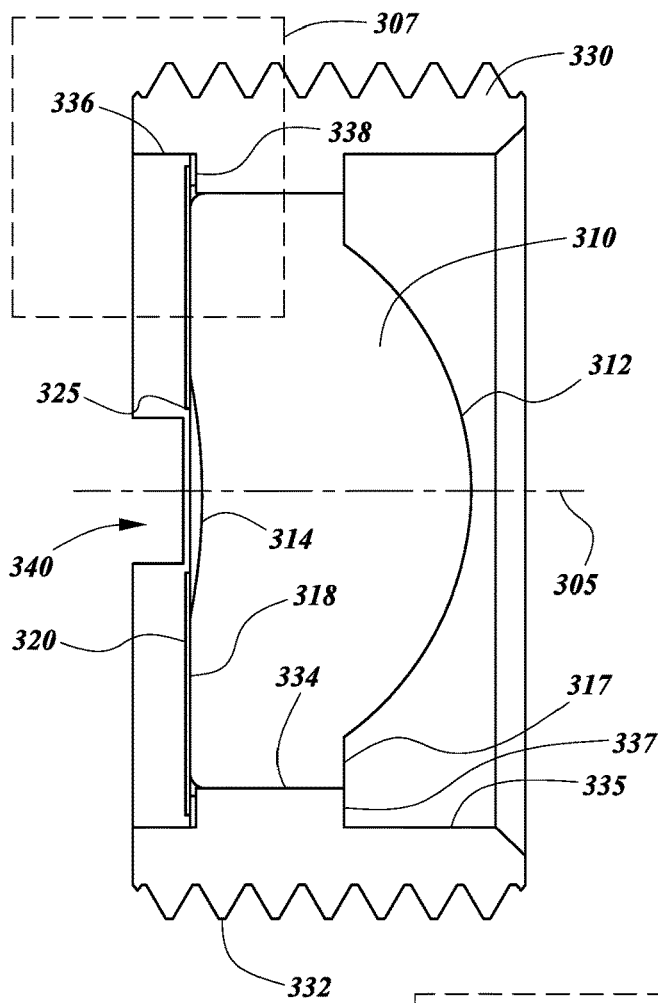
Figure 3C:
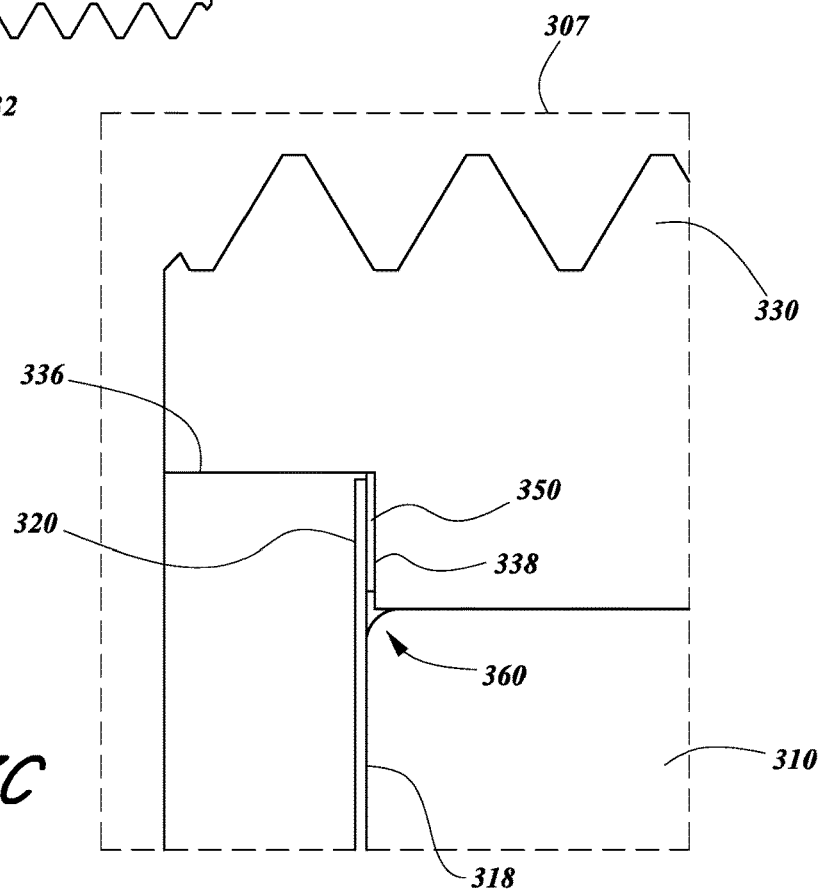

FIGS. 3A-3C illustrate an example integrated optical assembly 300 comprising an optical element such as a lens or window that is transparent to IR and/or visible light and an additional element 320 such as an optical aperture. FIG. 3A is a perspective view of the example integrated optical assembly 300 comprising the additional element 320. FIG. 3B is a cross-sectional side view of the example integrated optical assembly 300 of FIG. 3A taken across the line I-I. FIG. 3C is a close up view of the integrated optical assembly 300 of an area encompassed by a box 307 in FIG. 3B. The integrated optical assembly 300 may be similar to the integrated optical assembly 100 of FIG. 1. In some embodiments, as described above, the additional optical element 320 may be an element configured to receive, interact with and/or manipulate light, for example, IR light and/or visible light. The additional optical element 320 may comprise a material selected based on the physical properties of the materials of the optical element 310 and/or optics mount 330. For example, the additional optical element 320 may be formed of a material having a CTE that is selected to match the CTE of the optical element 310 and/or optics mount 330, as described above in connection to FIGS. 1-2B. Such matching may be useful for example, if the aperture is mounted using epoxy or welding. In some cases, the optical element 310 may comprise the same or similar material as the optics mount 330. As described above, in the example embodiment illustrated in FIGS. 3A-3C, the element 320 may comprise a mechanical aperture 320 although the additional element may comprise other components in other designs.

FIG. 3A-3C show the integrated optical assembly 300 with the transparent optical element 310 integrated with and include within an optics mount 330. The optical element 300 may be similar to the transparent optical element 110 described in connection to FIG. 1. Furthermore, the transparent optical element 300 may be formed in a manner similar to that described in connection with FIGS. 2A and 2B. As shown in FIG. 3B, the transparent optical element 310 comprises an optical surface 314 having an optical power (illustrated in this example as a concave curvature) centered on the optical axis 305 of the lens and the central longitudinal axis of the optical mount and integrated optical assembly. FIG. 3B also shows the transparent optical element 310 having a planar surface 318 disposed between the optical surface 314 and the optics mount 330. This planar surface 318 may be an annular surface surrounding the concave surface 314.

The optics mount 330 may be configured to support the optical element 310 as described above. The optics mount 330 may be similar to the optics mount 130 of FIG. 1. However, the optics mount 330 may optionally comprise a slot (not shown) configured to facilitate the insertion of the aperture stop 320 as described in more detail in connection to FIGS. 7A-8D. For example, the slot may (not shown) be configured to guide the aperture stop 320 into position along the central longitudinal axis 305 of the optical element 310.

In some embodiments, the aperture stop 320 may comprise a first surface adjacent to (e.g., contacting) the transparent optical element 310, a second surface, and an opening 325. The opening 325 may have a diameter selected, for example, based on the desired optical properties and performance of the integrated optical assembly 300 and or higher level optical system in which said integrated optical assembly 300 in incorporated. In some embodiments, the opening 325 may be an aperture or an entrance pupil of the transparent optical element 310. In the embodiment illustrated in FIG. 3B, the opening 325 has a size and shape that complements the size and shape planar surface 318 of the optical element 310. For example, the opening 325 may be circular have a diameter that is substantially similar to the diameter of the central optical surface 314 (which is concave in this example), while the planar surface 318 is annular with in inner diameter larger than the diameter of the opening 325 in the aperture stop 320. In some implementations, the aperture stop 320 may be manufactured by a stamping process that may be repeatable within precision tolerances to facilitate improved optical performance of the aperture stop 320 and integrated optical assembly 300 in which it is installed.

With reference to FIG. 3B, the aperture stop 320 may be guided into position with the aid of an inner sidewall surface 336 of the borehole in the optics mount 330. Accordingly, in various implementations, the borehole and aperture are configured such that the borehole aligns, e.g., centers, the aperture 320 with respect to the lens 310, which is also fixed within the optical mount 330 via the borehole. For example, the borehole and the aperture 320 may have similar cross-sectional size and shape such that the borehole laterally aligns the aperture with respect to the lens 310; the aperture does not move laterally much within the borehole to introduce misalignment. The aperture stop 320 may be positioned at any position along the borehole. For example, FIG. 3B depicts the aperture stop 320 positioned at or proximal to the planar surface 318 on the front side of the lens 310. In another implementation, the aperture stop 320 may be positioned at, proximal to, be supported by, and/or adhered to the ledge or surface 338 of the optics mount 310.

In various implementations, the integrated optical assembly 300 may comprise a securing structure 350 configured to secure the aperture stop 320 in position relative to the transparent optical element 310 and/or the optical mount 330. The aperture stop 320 may be secured by the securing structure 350 after the optical element 310 is simultaneously formed and integrated into the optics mount 330. In some implementations, the securing structure 350 comprises a bonding agent or adhesive such as an epoxy configured to secure the aperture stop 320 to the optics mount 330. For example, the aperture stop 320 may be attached to a surface of the optics mount 320, such as at the ledge or surface 338 via a bonding agent 350, as illustrated in FIG. 3C. By attaching the aperture stop 320 to the ledge or surface 338, the aperture stop 320 may be inserted into the integrated optical assembly 300 and secured in position relative to the optical element 310.

Accordingly, shown in FIG. 3C, in some implementations, the ledge or surface 338 may be parallel with and possibly separated (e.g., by a small amount) from the planar surface 318. Thus, as shown in FIG. 3C, a gap 360 may be formed between the aperture stop 320 and the ledge or planar surface 338. As illustrated in FIG. 3C, however, in various implementations, at least a portion of this gap 360 is filled with a bonding agent or adhesive (e.g., epoxy) to adhere the aperture stop 320 to the optical mount 330.

While FIGS. 3B and 3C illustrate the aperture stop 320 bonded to the ledge or surface 338, other configurations are possible. The aperture stop 320 may be bonded to any surface or area of the optics mount 330. Bonding the aperture stop 320 to the optical mount 330 may potentially enable the aperture stop 320 to sit substantially flat and parallel with the surface 318 of the optical element 310. The aperture stop 320 may thus contact the surface 318, for example, over a large portion of the surface (e.g., over most of the surface or at at least 50%, 75%, 90% or more of the radial locations about the longitudinal axis, etc.). Also, bonding the aperture stop 320 to a surface of the optics mount 330 may also provide a clean appearance and a clear path for the light to propagate that is not obstructed by bonding agent so as to cause refraction or scattering of the light by the bonding agent and to degrade or interfere, for example, with image formation. Thus, light passing through the optical element 310 may be unaffected by the securing structure 350, which may improve the performance of the integrated optical assembly 300.

While FIGS. 3A-3C depict an example of the integrated optical assembly 300 comprising an element 320 secured in position by a bonding agent 350 disposed between the optics mount 330 and the aperture 320, the integrated optical assembly 300 can be configured differently in other embodiments. For example, the aperture 320 may be secured in position in any possible configuration. FIGS. 4A-8C illustrate some of other examples of an integrated optical assembly in accordance with the disclosure herein, however, still other configurations are possible.

Further Example Integrated Optical Assemblies Including an Optical Element

Figure 4A:
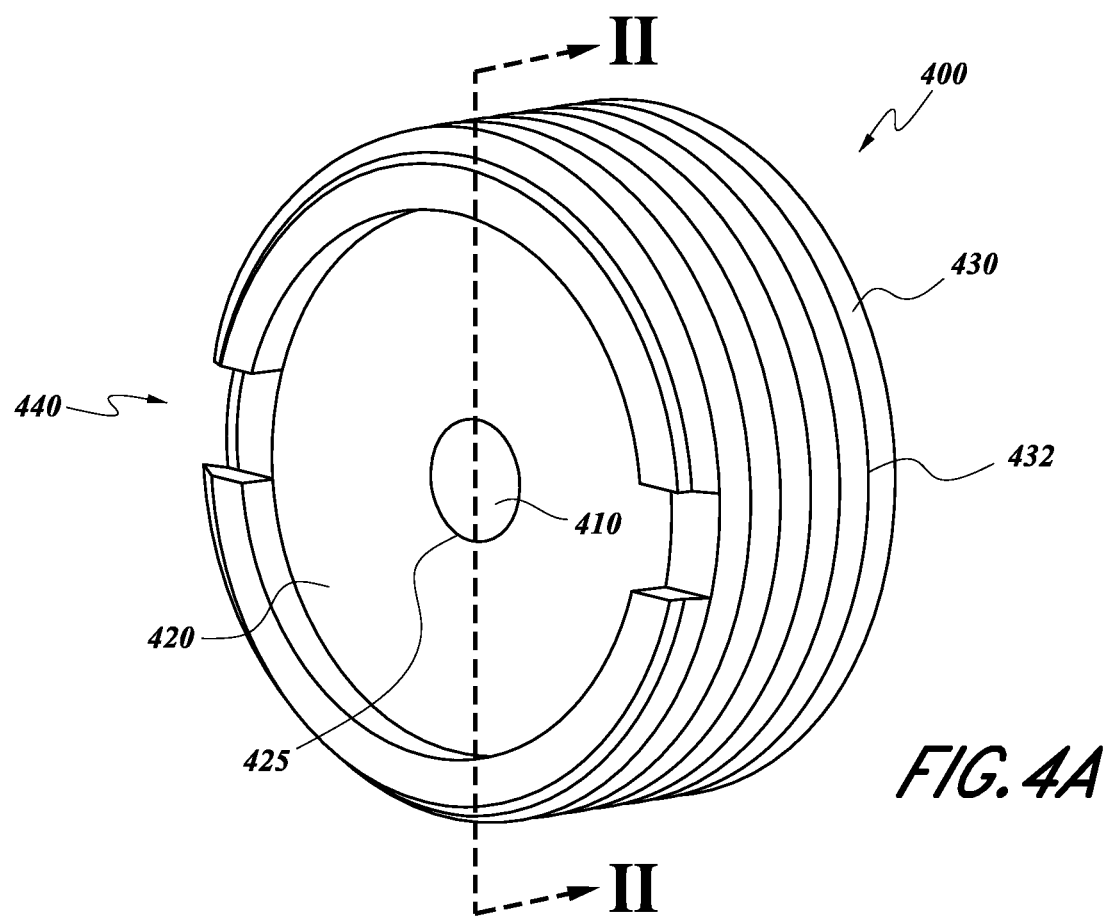
FIGS. 4A-4C illustrate another example integrated optical assembly comprising an additional optical element such as an optical aperture bonded to a transparent optical element such as a lens.
Figure 4B:
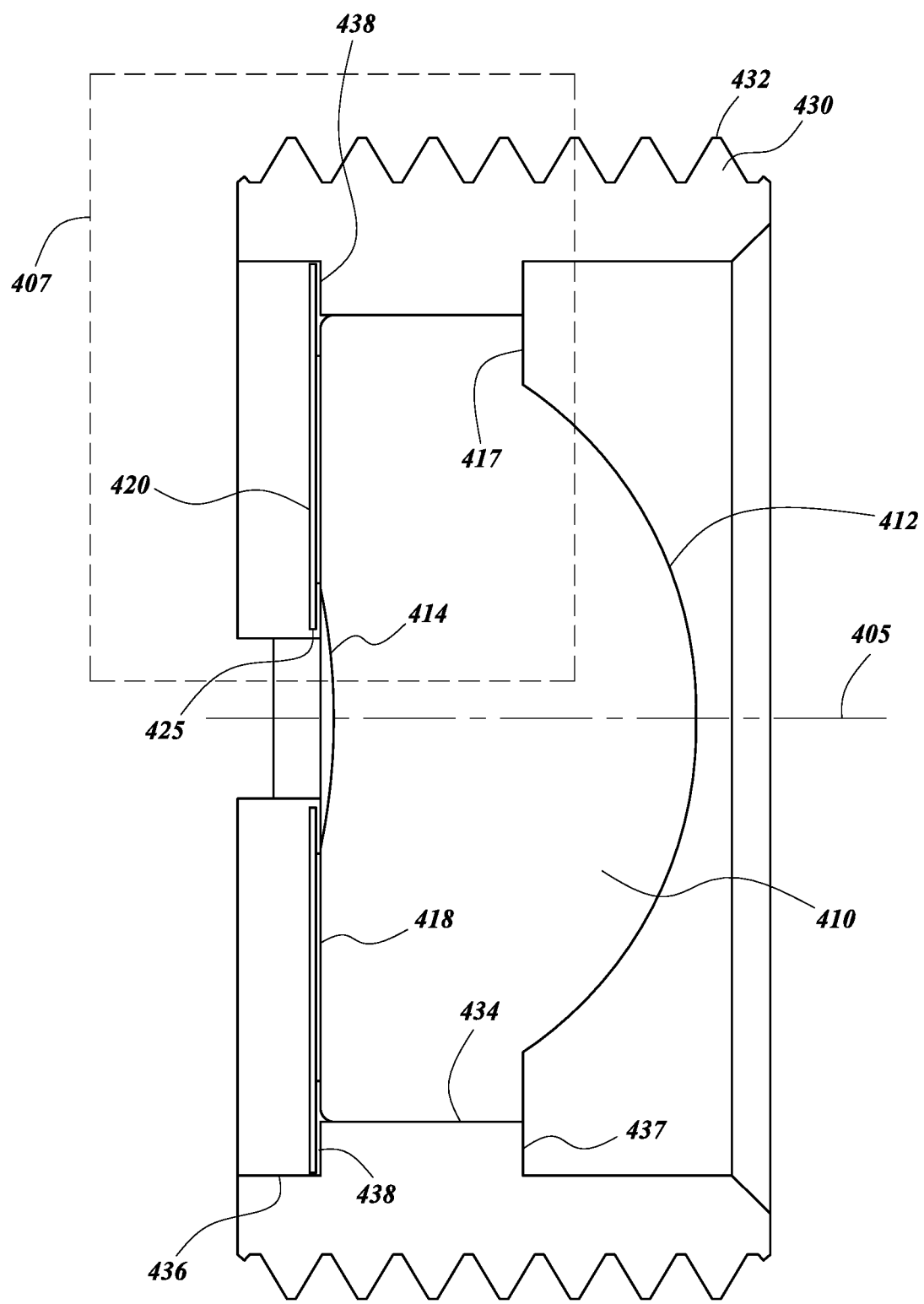
Figure 4C:
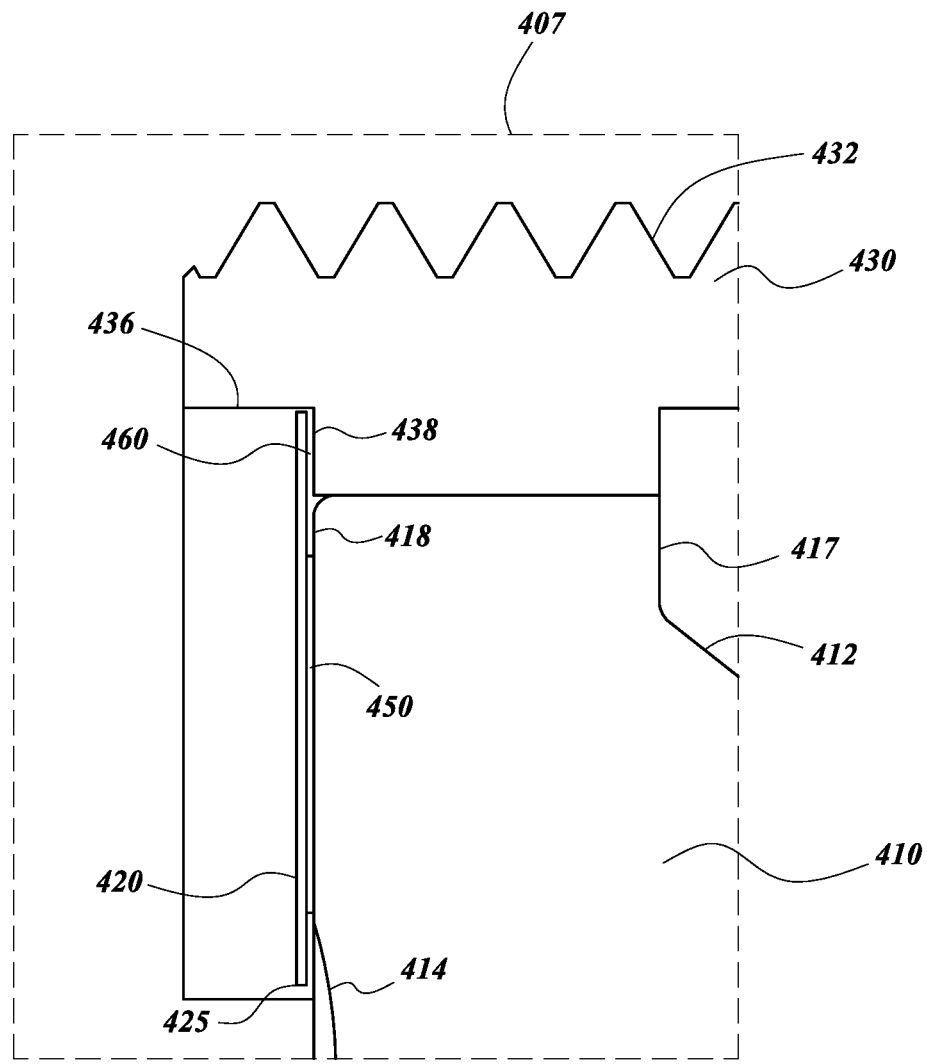

FIGS. 4A-4C illustrate another example of an integrated optical assembly 400 comprising an optical element 410 such as a lens or window that is transparent to IR and/or visible light and an additional optical element 420 such as an optical aperture. FIG. 4A is a perspective view of the example integrated optical assembly 400 comprising the aperture 420. FIG. 4B is a cross-sectional side view of the example integrated optical assembly 400 of FIG. 4A taken across the line II-II. FIG. 4C is a close up view of the integrated optical assembly 400 of an area encompassed by a box 407 in FIG. 4B. The integrated optical assembly 400 may be similar to the integrated optical assembly 300 of FIGS. 3A-3C and thus like reference numerals may be employed. For example, the transparent optical element (e.g., lens) 410 and optics mount 430 may be substantially similar to the transparent optical element (e.g., lens) 310 and optics mount 330 of FIGS. 3A-3B, respectively.

The additional optical element 420 may be similar to the additional optical element 320 of FIGS. 3A-3B. For example, as described above, the additional optical element 420 may be an element configured to receive, interact with, manipulate light, for example, IR and/or visible light such as a mechanical aperture. However, the additional optical element 420 may comprise the securing structure 450 disposed on a side of the element 420 adjacent to the transparent optical element 410. For example, the optical aperture 420 may comprise a sheet having first and second sides and an opening 425 therein, wherein adhesive 450 is disposed on said second side (closest to the lens 410) for contacting the lens. The additional optical element/optical aperture 420 may be inserted through the borehole of the optics mount 430 and laterally aligned, e.g., centered, by the borehole and inner sidewall surface 436 thereof. The securing structure 450 may as a result, contact a surface of the lens 410 and secure the aperture 420 to the lens. The securing structure 450 may be in contact with the lens 410 such as the planar surface 418 of the lens, as illustrated in FIG. 4C. Upon contact with the surface 418, the securing structure 450 may self-secure the aperture 420 relative to the lens 410. For example, the securing structure 450 may be a bonding agent, epoxy, or other adhesive applied to aperture 420 before attachment. Thus, once the aperture 420 is disposed to the desired location, the securing structure 450 thereon may secure the aperture to the surface of the lens 410. One non-limiting advantage of this embodiment is that the element 420 may be configured to be self-adhering or self-securing via the securing structure 450. The optical aperture 420 being self-adhesive simplifies the manufacturing process of adding the aperture to the integrated optical assembly 400. As discussed above, the borehole permits lateral alignment as the aperture 420 is brought to the lens surface 418 and the adhesive causes the aperture to adhere to the lens 410 once contacted thereto.

Figure 5A:
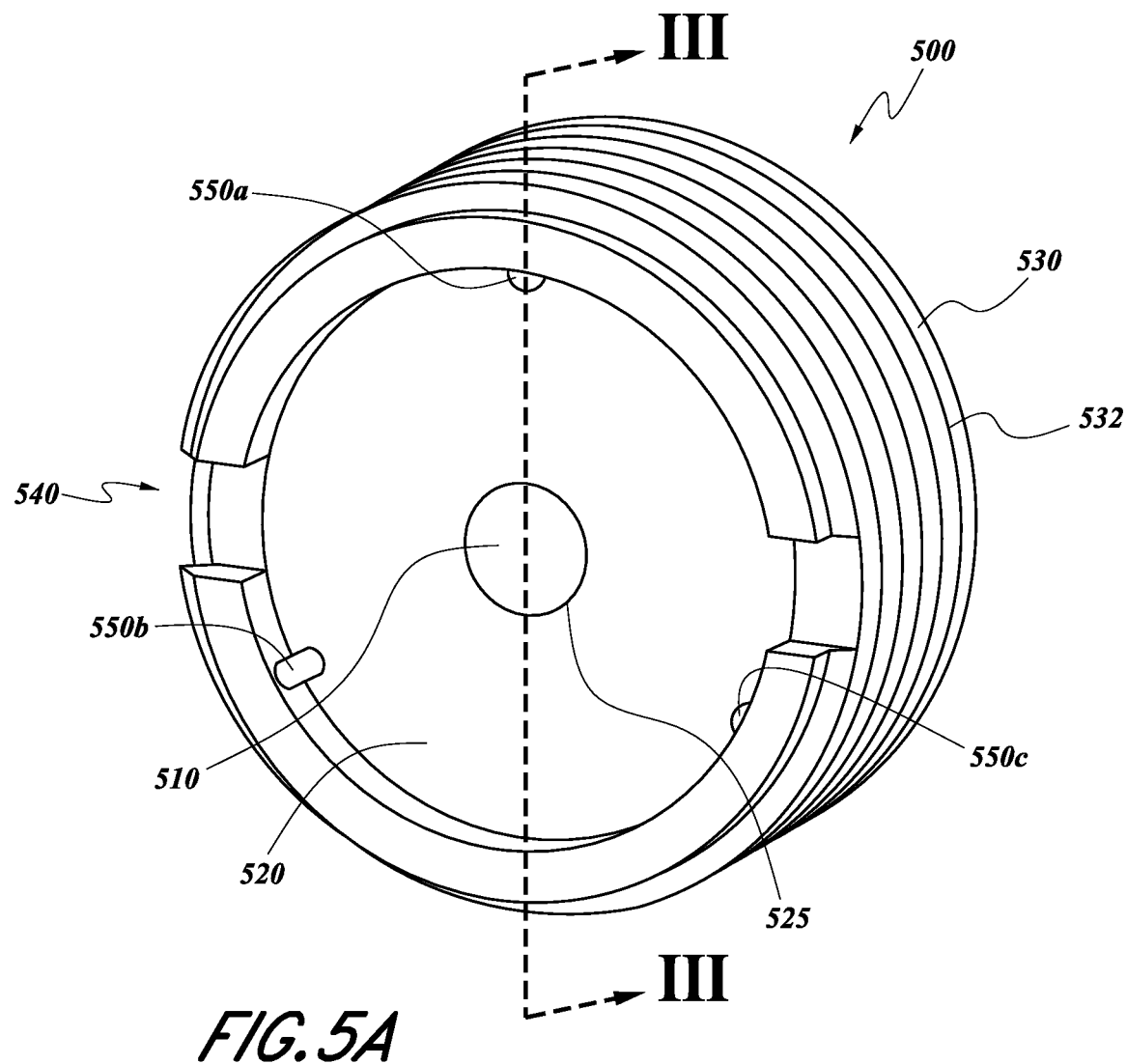
FIGS. 5A-5C illustrate another example integrated optical assembly comprising an optical element such as an optical aperture spot welded to the optical mount.
Figure 5B:
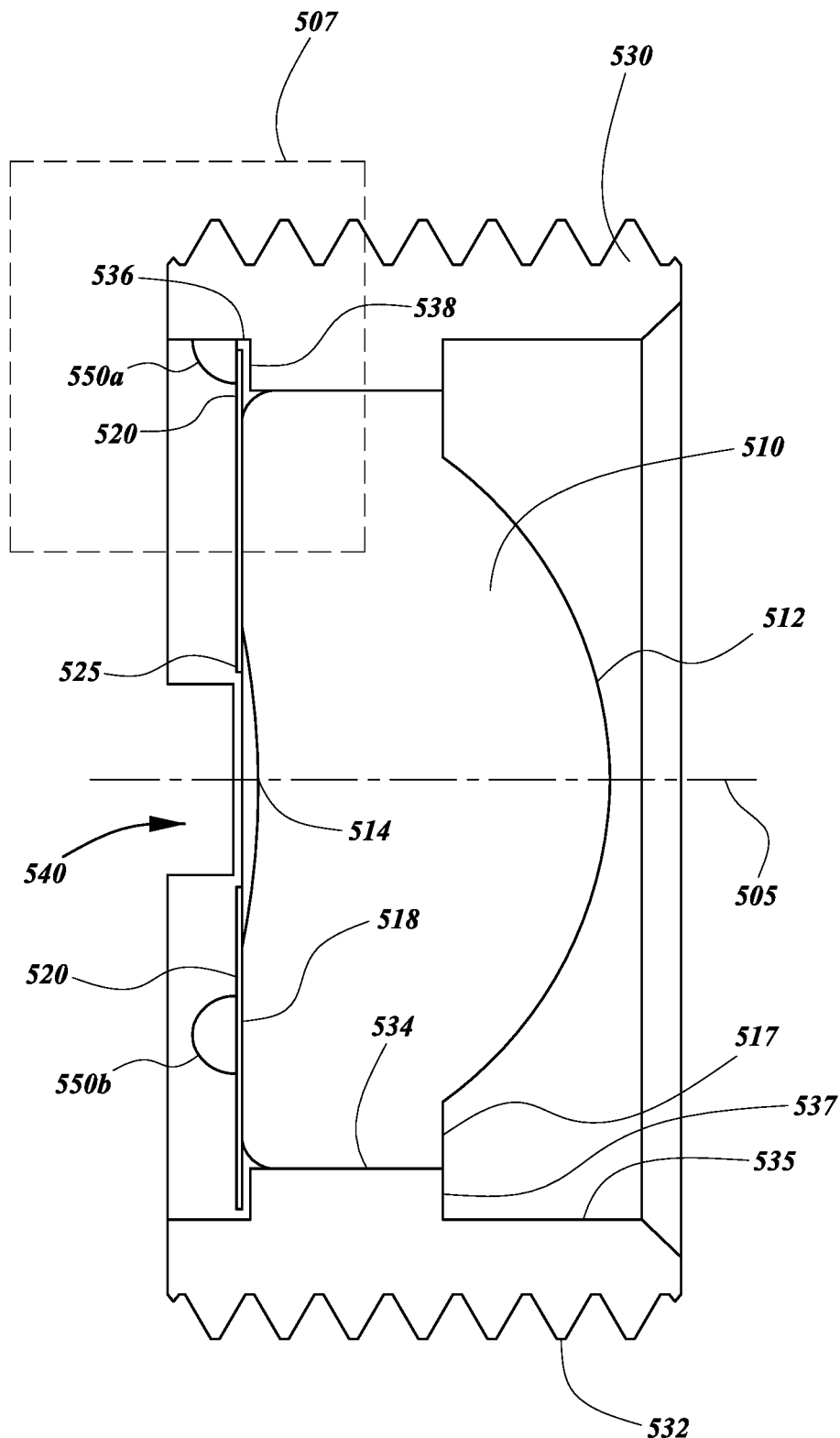
Figure 5C:
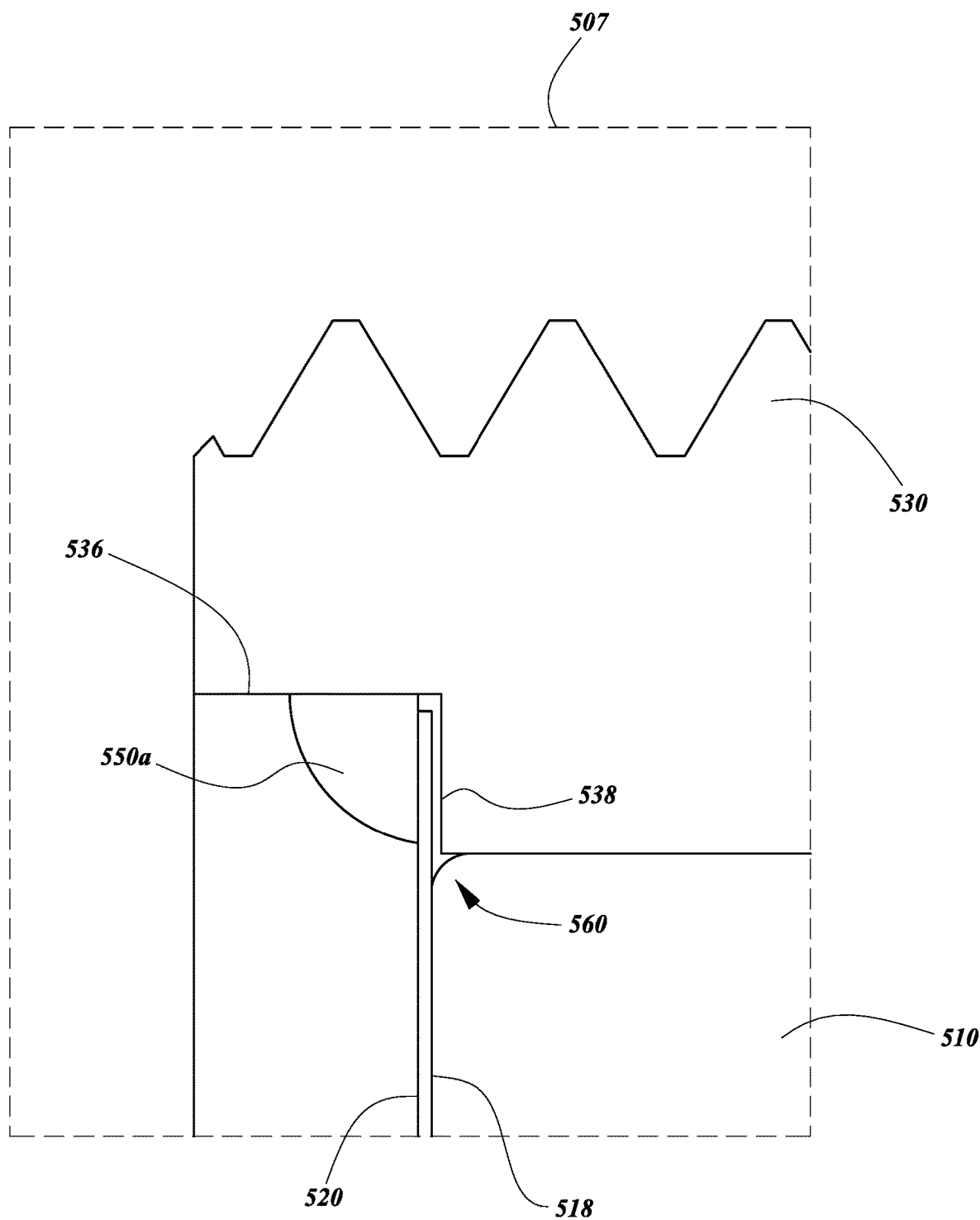

FIGS. 5A-5C illustrate another example integrated optical assembly 500 comprising an optical element 510 such as a lens or window that is transparent to IR and/or visible light and an additional optical element 520 such as an optical aperture. FIG. 5A is a perspective view of the example integrated optical assembly 500 comprising the aperture 520. FIG. 5B is a cross-sectional side view of the example integrated optical assembly 500 of FIG. 5A taken across the line III-III. FIG. 5C is a close up view of the integrated optical assembly 500 of an area encompassed by a box 507 in FIG. 5B. The integrated optical assembly 500 may be similar to the integrated optical assembly 300 of FIGS. 3A-3C and thus similar reference numerals may be used. For example, the transparent optical element (lens) 510 and optics mount 530 may be substantially similar to the optical element 310 and optics mount 330 of FIGS. 3A-3B, respectively.

The additional optical element 520 may be similar to the additional optical element 320 of FIGS. 3A-3B. For example, as described above, the additional optical element 520 may be an element configured to receive, interact with, and/or manipulate light, for example, IR and/or visible light, such as a mechanical aperture. However, once the optical aperture 520 is positioned relative to the optical element 510, the element 520 may be secured by a plurality of securing structures 550. In the embodiment of FIGS. 5A-5C, the securing structures 550a, 550b, 550c may be spot welds or the like configured to secure the element 520 to a surface (e.g., inner sidewall surface 536) of the optics mount 530 at one or more points. For example, FIG. 5A illustrates three spots substantially equally spaced around the surface 536 (e.g., every 120°). Thus, the welds 550 may secure the aperture 520 to the surface 536, thereby holding the aperture 520 in position relative to the lens 510.

While FIGS. 5A-5C illustrate three welds 550a, 550b, 550c, any number of securing structures (e.g., welds) may be possible. For example, the number of securing structures 550a, 550b, 550c may be, e.g., 2, 3, 4, 5, 6, etc. The number of securing structures 550a, 550b, 550c may be any number configured to secure the element 520 in position relative to the optical element 510.

As discussed above, the optical aperture 520 may be inserted through the borehole of the optics mount 530 and laterally aligned, e.g., centered, by the borehole and inner sidewall surface 536 thereof. The aperture 520 may be positioned anywhere along the longitudinal length 505 of the optical mount 530. In some implementations, however, the aperture 520 is positioned against the lens 510 or a surface (e.g., ledge 538) of the optical mount 530. Once in place, the aperture 520 may be welded to the optical mount 530. The welds 550a, 550b, 550c may be formed by laser or other methods. In various configurations the aperture 520 and housing 530 comprise the same or similar material. Via welding, the aperture 520 and housing 530 are fused (e.g. melted) to become joints, e.g., as one part. Example materials include aluminum or steel.

In some implementations such as shown in FIGS. 5B and 5C, the aperture 520 contacts the lens 510 (e.g., at the rear surface 518 of the lens). A gap 560 may separate the aperture 520 from portions and/or surfaces of the optical mount 530 such as from the ledge/surface 538. Welding the aperture stop 520 to the optical mount 530 may potentially enable the aperture stop 520 to sit substantially flat and parallel with the surface 518 of the optical element 510 as shown in FIGS. 5B and 5C. The aperture stop 520 may thus contact the surface 518, for example, over a large portion of the surface (e.g., over most of the surface or at at least 50%, 75%, 90% or more of the radial locations about the longitudinal axis, etc.). In some implementations, however, the aperture 520 may be positioned and secured via the welds 520 adjacent to but away from (e.g., not in contact with) the lens 510.

Welding the aperture stop 520 to a surface of the optics mount 330 may also potentially provide a clean appearance and a clear path for the light to propagate that is not obstructed by the securing structure 550a, 550b, 550c. Thus, light passing through the optical element 510 may be unaffected by the securing structure 550a, 550b, 550c, which may improve the performance of the integrated optical assembly 300.

Figure 6A:
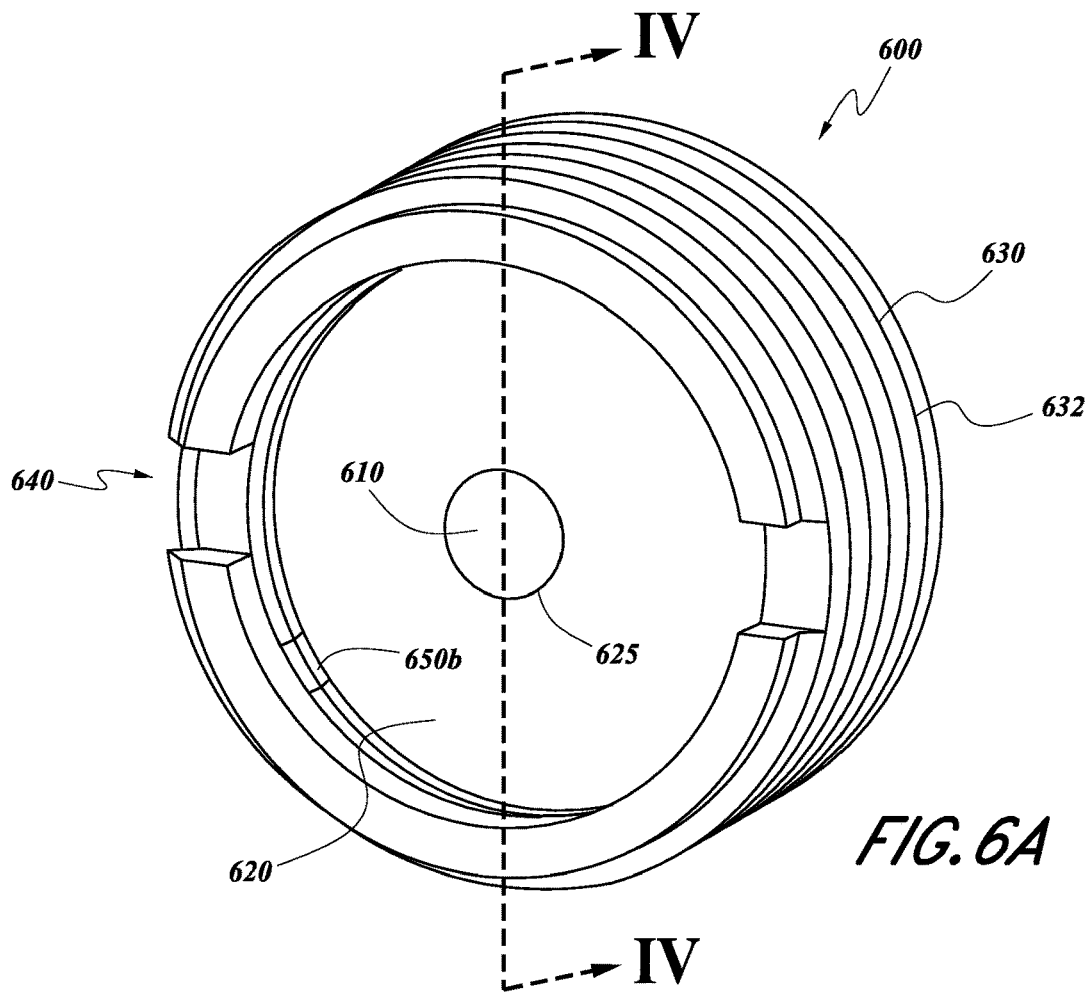
FIGS. 6A-6D illustrate another example integrated optical assembly comprising an additional optical element such as an optical aperture having tabs that spring load the additional optical element into position by fitting into a groove in the optical mount.
Figure 6B:
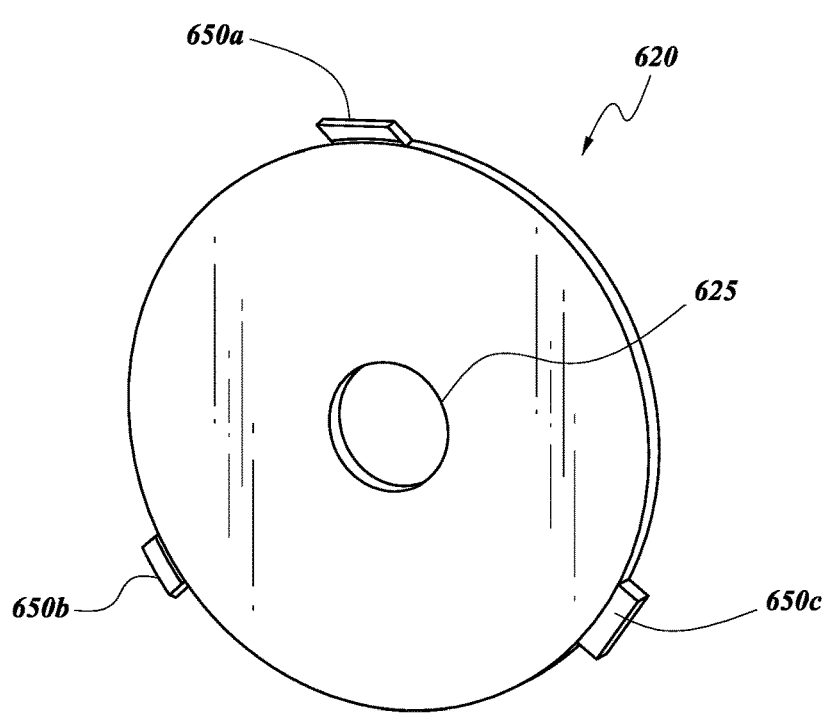

FIGS. 6A-6D illustrate another example integrated optical assembly 600 comprising an optical element 610, such as a lens or window that is transparent to IR and/or visible light, and an additional element 620, such as an optical aperture. FIG. 6A is a perspective view of the example integrated optical assembly 600 comprising the optical aperture 620. FIG. 6B is a perspective view of the optical aperture 620 in accordance with the embodiments illustrated in FIG. 6A.

Figure 6C:
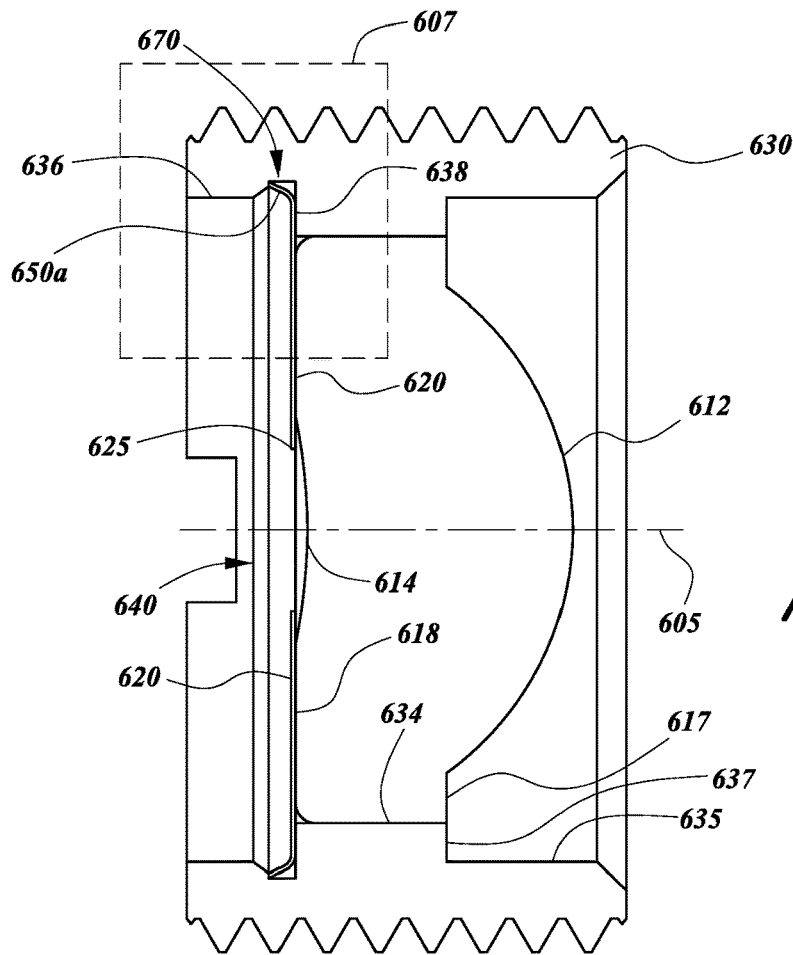
Figure 6D:
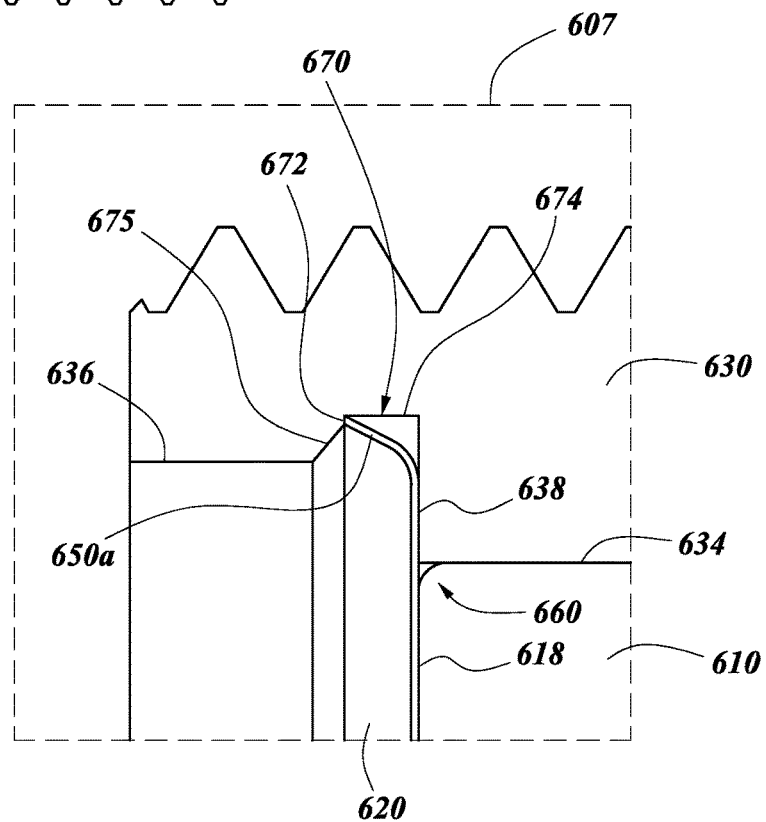

FIG. 6C is a cross-sectional side view of the example integrated optical assembly 600 of FIG. 6A taken across the line IV-IV. FIG. 6D is a close up view of the integrated optical assembly 600 of an area encompassed by box 607 in FIG. 6C. The integrated optical assembly 600 may be similar to the integrated optical assembly 300 of FIGS. 3A-3C as well as the lens 110 of FIG. 1 and thus similar reference numerals may be used.

FIGS. 6A, 6C, and 6D show the lens 610 integrated in an optical mount 630. The lens 610 may be similar to the lens 110 described in connection with FIG. 1. Furthermore, the lens 610 may be formed in a manner similar to that described in connection with FIGS. 2A and 2B.

The optics mount 630 may be similar to the optics mount 130 of FIG. 1. However, the optics mount 630 may comprise a groove 670 configured to accept a plurality of securing structures 650 comprising tabs configured to provide spring loading. The groove 670 may have a groove diameter defined by the distance between the central longitudinal axis of the optical mount 630 or optical axis 605 of the lens 610 and the sidewall surface 674 in the groove 670. Similar to FIG. 1 above, the optics mount 630 comprises a borehole (e.g., counter bore) having a bore diameter defined by the distance from the optical axis 605 to the inner sidewall surface 636 at the second end of the optic mount. The groove diameter may be larger than the counter bore diameter at the second end of the optics mount 630 as shown in FIGS. 6C and 6D. The groove 670 may additionally have a locking surface 672 that receives the end of the tabs 650 and can provide stable locking of the tab in the groove.

FIG. 6B depicts the additional optical element 620, which may be similar to the element 320 of FIGS. 3A-3B. For example, as described above, the additional element 620 may be an element configured to receive, interact, and/or manipulate light, for example, IR and/or visible light, such as a mechanical aperture. In the example design illustrated in FIGS. 6A-6D, the optical element comprises an aperture stop 620 having a plurality of securing structures 650a, 650b, and 650c comprising tabs that provide for spring loading. As illustrated, the securing structures (e.g., tabs) 650a, 650b, and 650c may be disposed at substantially equal distances from each other around the circumference of the optical aperture 620 (e.g., one approximately every 120 degrees). While three tabs 650a, 650b, and 650c are illustrated in FIG. 6B, it will be appreciated that other configurations are possible. For example, the element 620 may comprise 2 or more tabs 650 disposed opposite of each other about the circumference of the optical aperture 620. Or, there may be 4, 5, 6, etc. tabs 650a, 650b, and 650c disposed about the optical aperture 620. The position of the tabs 650a, 650b, and 650c need not be exactly equal, as long as the securing structures 650 are configured to hold the optical aperture within the optics mount 630 relative to the lens 610.

In the embodiment illustrated in FIG. 6B, the tabs 650a, 650b, and 650c may be of the same or different material as the remainder of the aperture 620. The tabs 650a, 650b, and 650c may also be formed during the same manufacturing process as the optical aperture 620. As shown in FIG. 6B, the tabs 650a, 650b, and 650c may be configured to extend in a direction outward from the center of the optical aperture 620 (e.g., corresponding to the e.g., the optical axis 605 of the lens 610) and parallel with the optical aperture 620. The tabs 650a, 650b, and 650c may be configured to provide spring loading to secure the aperture 620 in place. The tabs 650a, 650b, and 650c may, for example, also extend in a direction away from (e.g., not parallel with) a plane of the surfaces of optical aperture 620. For example, as illustrated in FIG. 6C, the tabs 650 extends outward from the central longitudinal axis 605 of the optics mount 630 and the optical axis 605 of the lens 610 and in the direction away from the center of the optical aperture 620. The tabs 650a, 650b, and 650c are also bent so that the tabs extend rearward towards the second end of the optics mount 630 and the integrated optical assembly 600. These bends provide a spring force in the direction toward the second end of the optics mount 630 when flexed in a direction toward the first end.

The tabs 650 may be configured to fit into the groove 670. For example, as illustrated in FIGS. 6C and 6D, an end of the tabs 650 may be configured to fit within groove 670 and be in contact with one or more surfaces of the groove 670. In one design, the tabs 650 may be in contact with either one of or both of locking surface 672 or inner wall surface 674. As described above, when the tabs 650 are positioned within the groove 670, the optical aperture 620 may be held in position relative to the lens 610, possibly in part by spring loading (e.g., bent rearward) such that the ends of the tabs push against the locking surface 672.

In one implementation, for example, while the optical aperture 620 is inserted into position via the borehole, an end of the tabs 650a, 650b, 650c slides along the inner sidewall surface 636 (counter bore). The surface 636 applies an inward force onto the tabs 650a, 650b, 650c towards the central longitudinal axis of the optics mount 630 and the optical axis 605 of the lens 610, thereby causing the tabs 650a, 650b, 650c to bend and apply a reciprocal (outwardly directed) force against the inner sidewall (counter bore) surface 636.

When the aperture 620 is pushed into position closer to the lens, the tabs 650a, 650b, 650c may no longer be in contact with the surface 636 (counter bore inner sidewall surface), and may snap outward freed from the inward force imparted by this surface 636. The tabs 650a, 650b, 650c may then move or snap into position, such that the end of the securing structure is within groove 670. For example, the end of the tabs 650a, 650b, 650c may be fit within the corner defined by the locking surface 672 and surface 674. In some embodiments, the tabs 650a, 650b, 650c may continue to apply an outward pressure against the surface 672 or 674, such that the element 620 does not move relative to the optical element 610. Depending on the design, the element 620 may comprise plastic, aluminum, or steel.

In some embodiments, the optics mount 630 may comprise a bevel surface 675 between the counter bore surfaces 636 and the groove sidewall surface 674. The bevel surface 675 may be configured to assist with a smooth transition the tabs 650a, 650b, 650c from the counter bore surface 636 to the groove 670. For example, when the aperture 620 is close to reaching the lens 610 or the desired position with respect to the lens, the tabs 650a, 650b, 650c may press against the bevel surface 675 such that the mechanical aperture is steadily locked into position. The sloping surface 675 may reduce breaking, chipping, or other degradation of the inner sidewall surfaces of the optics mount 630 as the aperture snaps into position.

While a specific example of groove 670 and tabs 650a, 650b, 650c are illustrated in FIGS. 6A-6D, other configurations are possible. For example, the groove 670 need not be a continuous groove about the circumference of the optics mount 630. The groove 670 may comprise a plurality of grooves 670, for example, such that the number of grooves matches the number of tabs 650a, 650b, 650c. However, there may be more grooves 670 then tabs 650a, 650b, 650c.

Figure 7A:
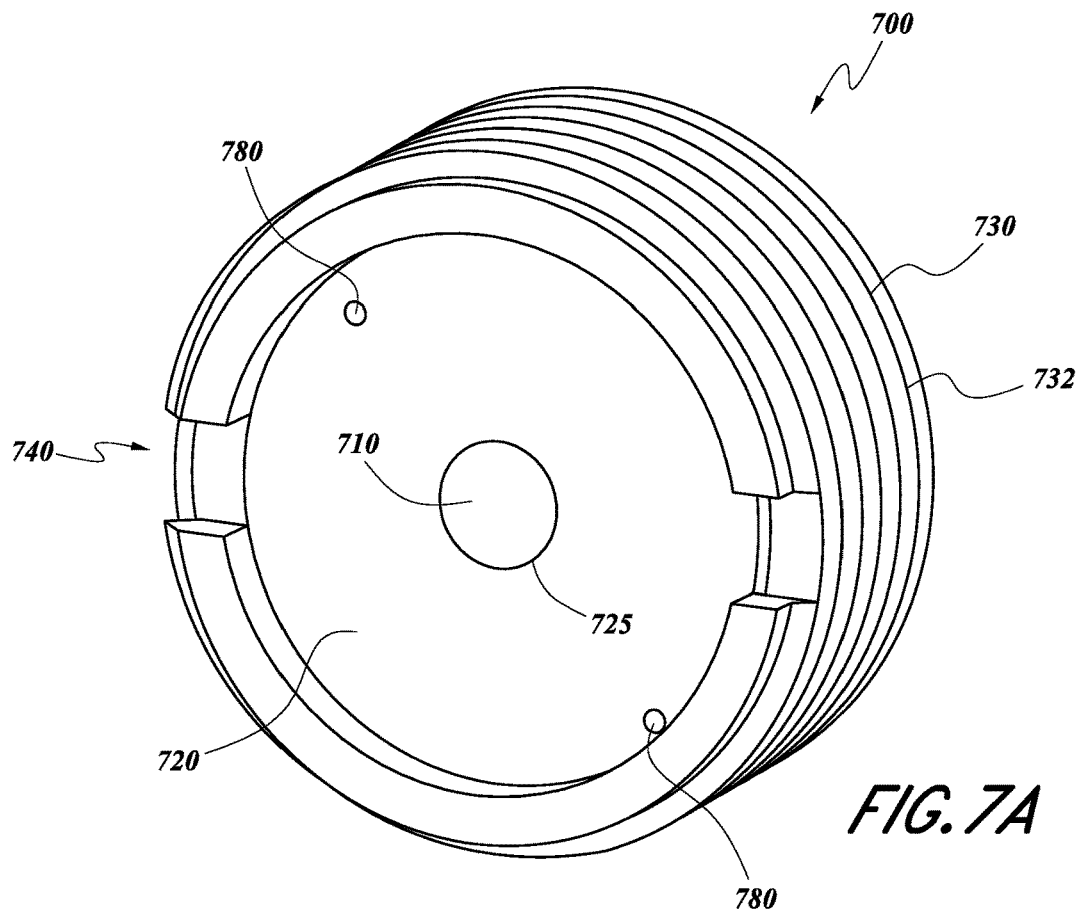
FIGS. 7A-7D illustrate another example integrated optical assembly comprising an additional element such as an optical aperture having tabs that a fit into slots in the optical mount such that the optical aperture can be rotated and locked into position.
Figure 7B:
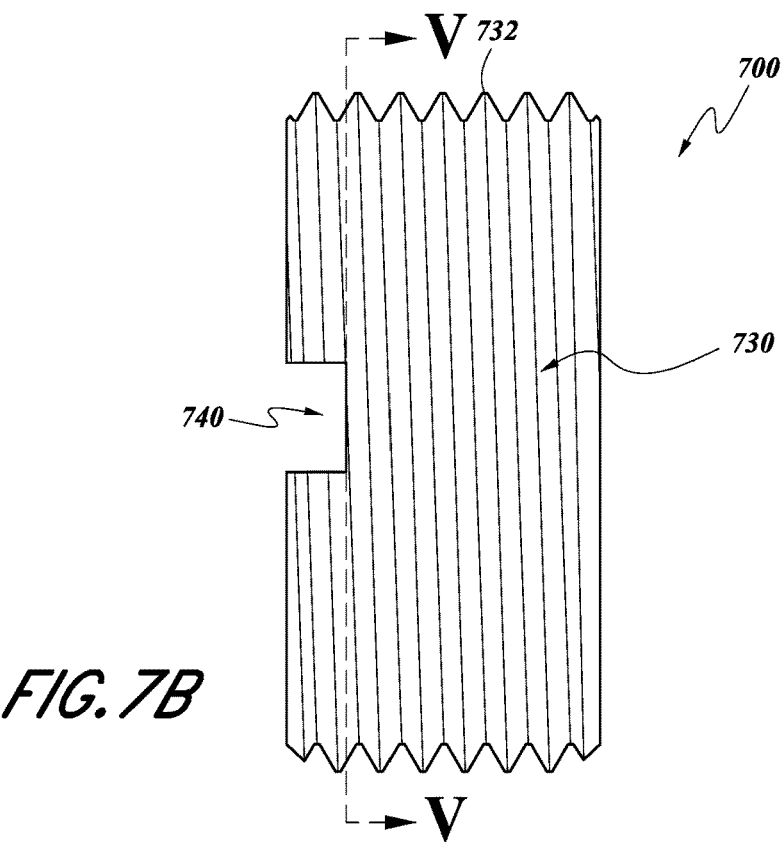
Figure 7C:
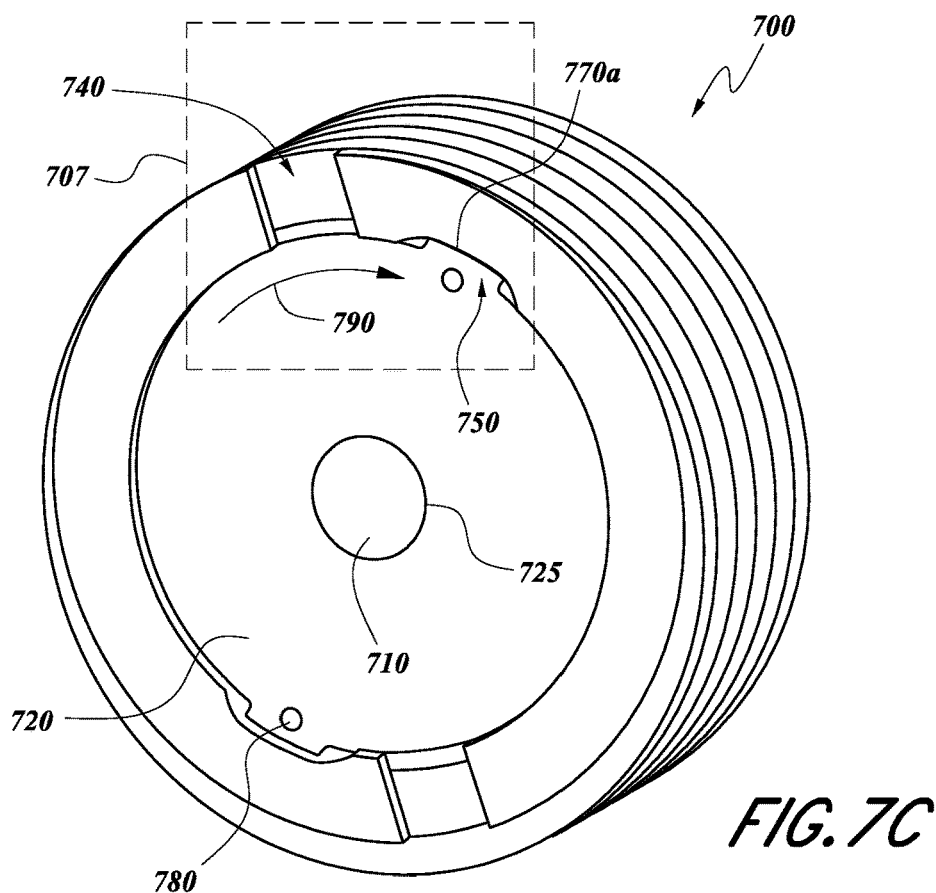
Figure 7D:
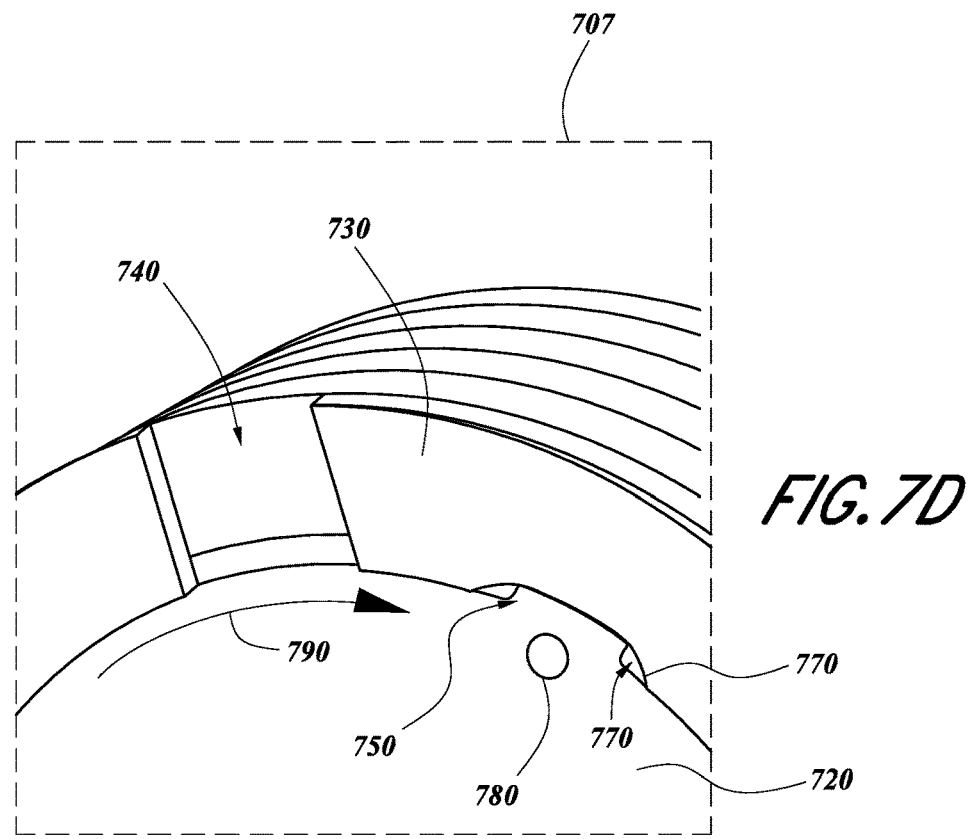

FIGS. 7A-7D illustrate another example integrated optical assembly 700 comprising an optical element 710, such as a lens or window that is transparent to IR and/or visible light, and an additional element 720, such as an optical aperture. FIG. 7A is a perspective view of the example integrated optical assembly 700 comprising the optical aperture 720. FIG. 7B is a side view of the integrated optical assembly 700 of FIG. 7A. FIG. 7C is sectional perspective view of the integrated optical assembly 700 taken across taken across the line V-V of FIG. 7B. FIG. 7D is a close up view of the integrated optical assembly 700 of an area encompassed by box 707 in FIG. 7C. The integrated optical assembly 700 may be similar to the integrated optical assembly 600 of FIGS. 6A-6D. For example, the lens 710 may be substantially similar to the lens 610 of FIGS. 6A-6D. Furthermore, the lens 710 may be formed in a manner similar to that described in connection to FIGS. 2A and 2B. The optical element 710 may also be substantially similar to the lens 110 if FIG. 1 and thus similar reference numerals may be used.

The optics mount 730 may also be similar to the optics mount 630 of FIGS. 6A-6D. However, the optics mount 730 may comprise a plurality of slots 740 configured to accept a plurality of securing structures 750 such as tabs as illustrated in FIGS. 7A-7D. The slots 740 may be configured to accept respective securing structures (tabs) 750.

Referring to FIG. 7C, each slot 740 allows the tabs 750 to access a groove 770 in the optical mount 730 that extends outward from the central longitudinal axis of the optics mount and the optical axis 705 of the lens 710 into the sidewall of the optics mount 730. The tabs 750 can be aligned with the slots 740 and inserted therein, and the aperture 720 can be rotated so that the tabs slide within the groove 770. The groove 770 may have a recessed diameter that is larger than the counter bore diameter. The groove 770 may be configured such that the plurality tabs 750 fits within the groove 770. The groove 770 may be positioned adjacent the ledge or surface 738 such that when the tabs are inserted in the groove 770 the aperture 720 is disposed adjacent to the ledge or surface 738 and the lens 710, for example, the front planar surface portion 718 of the lens.

In some design, a single groove 770 received multiple tabs 750 (for example, via multiple slots 740). However, for some designs, a plurality of grooves 770 receive the plurality of tabs 750 (via multiple slots 740 associate therewith). The number of grooves 770 may be the same as the number of slots 740. For example, FIG. 7C illustrates two slots 740. Accordingly, two grooves 770 could be configured to receive two tabs 750 via the two slots 740. These grooves 770 may be located on opposite sides of the optics mount 730 and offset from the slots 740. While a specific example is illustrated in FIG. 7C, other configurations are possible. For example, the length of the groove 770 around the longitudinal axis 705 of the mount 730 may vary. For some designs, a single groove 770 extends 360° around the longitudinal axis. For other designs, multiple grooves 770 extend less than 360° around the optical mount 730.

While two tabs 750 are shown in FIG. 7C, the optical element may include more than 2 securing structures 750 (e.g., 3, 4, 5, etc.). In some embodiment, the securing structures 750 may be disposed on opposite sides of the aperture 720 as illustrated in FIG. 7C, however, the tabs can be arranged differently. The tabs 750 can be equally spaced about the optical aperture 720 or unequally spaced about the aperture. In various designs the size and shape of the tabs 750 may be configured to fit within the slots 740 and groove(s) 770, as illustrated in FIG. 7C. The tabs 750 may be substantially parallel to plane defined by the surfaces of the optical aperture 720, however, as discussed below, the tabs can also be bent.

In some embodiments, the optical aperture 720 may also comprise a plurality of holes 780 configured to accept a tool (not shown) to rotate the optical aperture and slide the tabs 750 into the grooves 770. For example, the optical aperture 720 may comprises a sheet having two holes 780. The holes 780 may be disposed at a radial distance from the center of the opening 725 and the central longitudinal axis 705 of the optical mount 730 and/or the optical axis 705 of the lens 705. The position of the holes may vary, for example, based on the tool to be used. The holes 725 may be disposed opposite of each other, however the position of holes 725 may be arranged differently. While FIG. 7C illustrates two holes 725, one or more holes (e.g., 3, 4, etc.) may be included. Also, while FIG. 7C illustrates the holes 725 aligned with a tabs 750, the holes 780 may be disposed at different locations on the optical aperture 720.

Referring now to FIG. 7D, the tabs 750 are configured to fit within the grooves 770 to secure the element 720 into position with respect to the lens 710. To integrate the optical aperture 720 with the optical mount 730, the optical aperture 720 may be inserted into position via the borehole and centered by the side wall surface 736 of the borehole (counter bore). For example, a tool may be inserted into the holes 780 and used to guide the element 720 into position. The tabs 750 may be aligned with and inserted into the slots 740, thereby guiding the tabs and the optical aperture 720 through the borehole. With the tabs 750 in the slots 740, the tool may be rotated by a user such that the tabs are similarly rotated in a direction 790 in the groove 770. The tabs 750 are locked in relief. The tabs 750 may fit snuggly in the groove 770 thereby securing the tab in the groove and the aperture 720 into position relative to the lens 710.

Figure 8A:
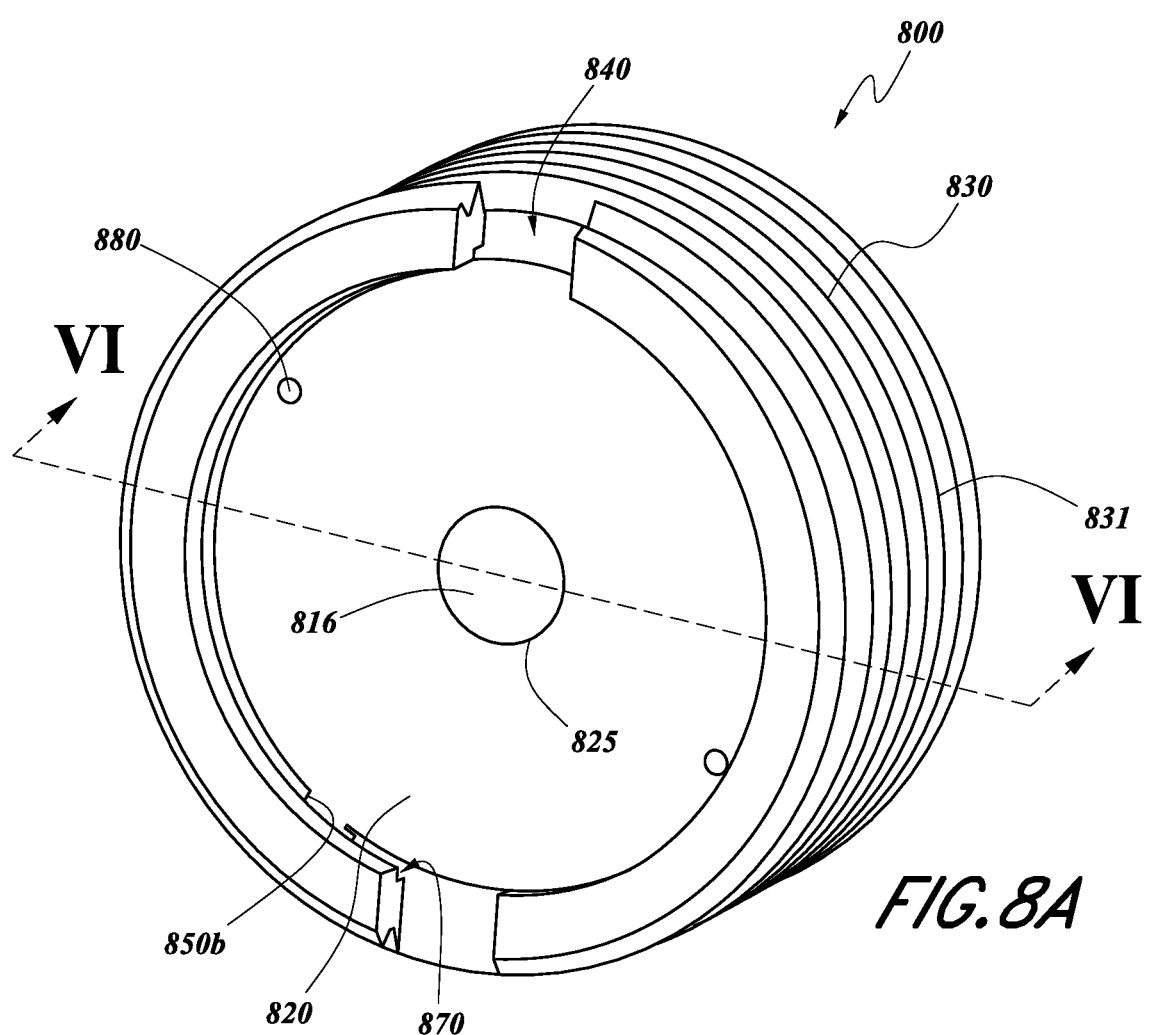
Figure 8B:
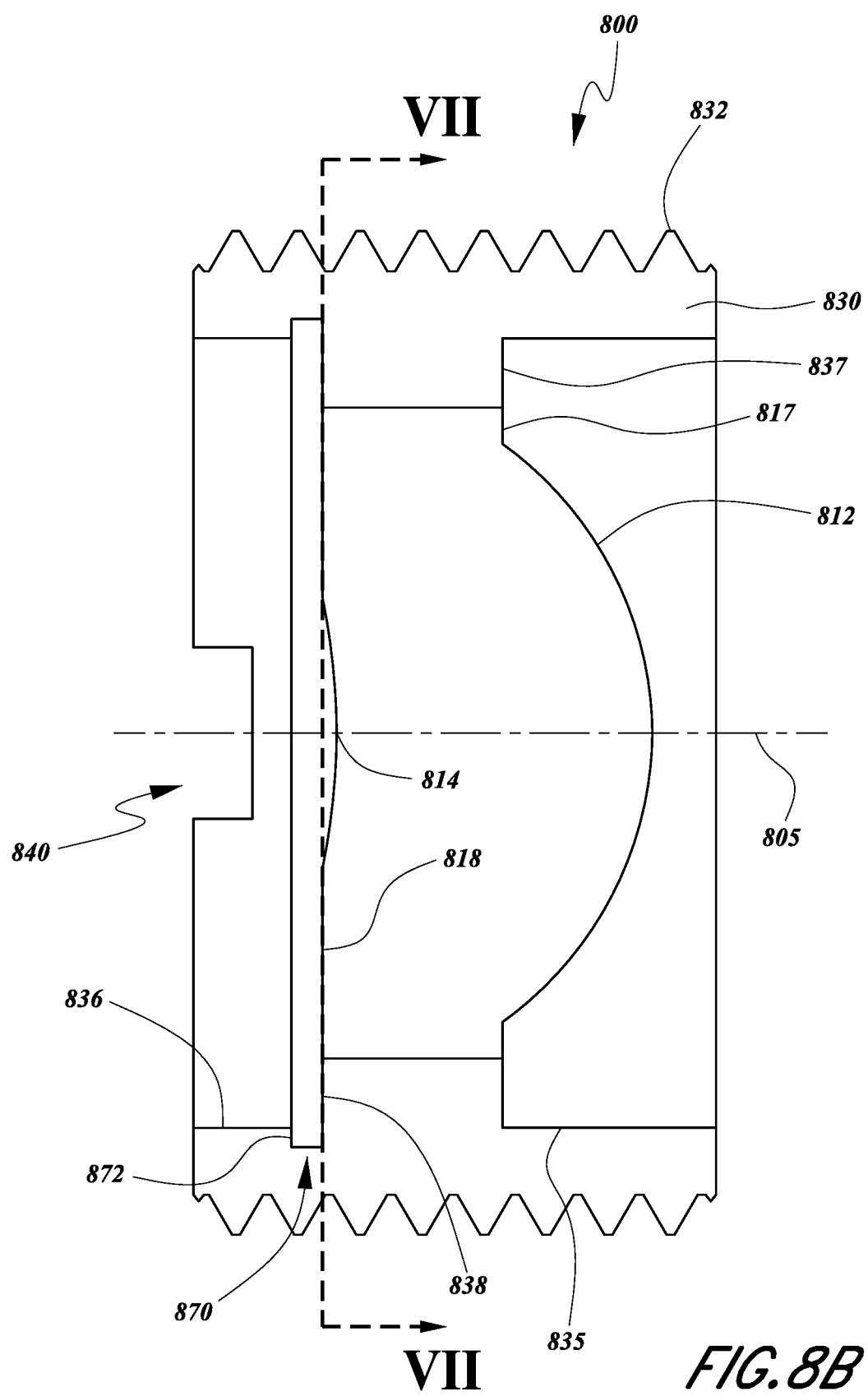

FIGS. 8A-8C illustrate another example integrated optical assembly 800 comprising an optical element 810, such as a lens or window that is transparent to IR and/or visible light, and an additional element 820, such as an optical aperture. FIG. 8A is a perspective view of the example integrated optical assembly 800 comprising the optical aperture 820. FIG. 8B is a cross-sectional side view of the integrated optical assembly 800 taken along the line VI-VI of FIG. 8A. FIG. 8C is a perspective view of an example optical aperture 820. FIG. 8D is another perspective view of the integrated optical assembly 800. The integrated optical assembly 800 may be similar to the integrated optical assembly 600 of FIGS. 7A-7D. For example, the lens 810 and optics mount 830 may be substantially similar to the lens 710 and optics mount 730, respectively, shown in FIGS. 7A-7D. Furthermore, the optical element 810 may be formed in a manner similar to that described in connection with FIGS. 2A and 2B and the optical element 810 may be substantially similar to the optical element 110 if FIG. 1, thus similar reference numerals may be used.

Referring to FIG. 8C, the optical aperture 820 comprises a plurality of securing structures 850 such as tabs or extensions 850a and 850b extending from a main body portion 821 of the optical aperture 820. The main body portion 821 may comprise a planar sheet having an annular shape or cross-section with a central opening 825 therein. As illustrated in FIG. 8C, the tabs 850a, 850b may extend tangentially and/or radially from the main body portion 821 as well as out of the plane of the planar sheet comprising the main body portion. While two tabs 850a, 850b are illustrated in FIG. 8C, additional tabs may be employed. For example, the aperture 820 may include 3 or more (e.g., 4, 5, 6, etc.) tabs 850a, 850b disposed along the circumference of the main body 821 of the aperture 820. As illustrated, the tabs 850a, 850b may be disposed at substantially equal distance from each other about the circumference of the aperture 820, for example, on opposite sides of the aperture. However, the spacing of the tabs 850a, 850b about the aperture need not be identical.

In the design illustrated in FIG. 8C, the tabs 850a, 850b may be of the same or different material as the element 820. Depending on the design, the element 820 and tabs 850a, 850b may comprise, for example, aluminum, plastic or steel. The tabs 850a, 850b may also be formed during the same manufacturing process as the aperture 820. For example, the aperture 820 can be manufactured using a stamping process. The tabs 850a, 850b can be subsequently shaped. As shown in FIG. 8C, the tabs 850a, 850b may comprise a protrusion or extension comprising a first proximal portion 854 connecting the tabs 850a, 850b to the main body portion 821 of the aperture 820, a second distal portion 856, and a medial portion 852 therebetween. The proximal portion 854 may be substantially parallel to the main body portion 821 of the aperture 820 and may be in-plane with the planar sheet forming the main body portion. In contrast, the medial portion 852 may be angled with respect to the proximal portion 854 and the main body portion 821 of the aperture 820. Likewise the medial portion 852 may be out of the plane of the planar sheet forming the main body portion 821 of the aperture 820. The distal portion 856 may also be angled with respect to the medial portion 852. In the design illustrated in FIG. 8C, the distal portion 856 is angled with respect to the medial portion 854 such that the distal portion and the proximal portion 854 are generally parallel and parallel with the main body portion 821 of the aperture 820. Accordingly, the distal portion 856 may be substantially parallel with the planar sheet forming the main body portion 821 of the aperture 820 yet displaced at a distance from plane of the planar sheet forming the main body portion of the aperture. In some designs, however, the distal portion 856 may not be parallel to plane of the planar sheet forming the main body portion 821 of the aperture 820 and may extend in a non-parallel direction away from the main portion of the aperture. In some embodiments, the aperture 820 may also comprise a plurality of holes 825 configured to accept a tool (not shown) similar to the holes 725 described in connection to FIGS. 7A-7D.

Referring now to FIG. 8D, the aperture 820 may be inserted into position via the borehole and centered by the inner sidewall surface (counter bore) 836. For example, as described in connection to FIGS. 7A-7D, the tool may be inserted into the holes 880 and used to guide the aperture 820 into position. The tabs 850a, 850b may be aligned with and inserted into the slots 840. In some cases, the slots 840 may guide the tabs 850a, 850b and the aperture 820 through the borehole.

As discussed in connection with FIG. 7A-7D above, the tabs 850a, 850b may be configured to fit within a groove 870 to secure the aperture 820 into position. For example, once the aperture 820 is moved into a positioned within the groove 870, the user may rotate the aperture 820 (using the tool inserted in the holes 880) in a clockwise or counter clockwise direction 890 such that the tabs 850a, 850b are rotated in the groove 870 and locked in relief. The tabs 850a, 850b may be configured to be spring loaded so as to more firmly secure the tabs in the groove 870. The angled medial portion 852 and distal portion 856 longitudinally displaced from the proximal portion 854 may provide such spring loading. Consequently, the aperture may be more securely positioned in the mount relative to the lens 810. For some designs, the spring loaded tabs 850a, 850b may also force the optical aperture 820 up against the lens 810.

As discussed above with regard to FIGS. 7A-7D, more than one groove 870 can also be used to receive the tabs 850a, 850b and secure the optical aperture 820 to the optics mount 830. Other variations are also possible.

While specific examples have been described in connection to the various figures above, the embodiments herein are not mutually exclusive. For all embodiments in this disclosure, any feature, structure, component, etc., illustrated and/or described for use in any one example integrated optical assembly, such as any of those illustrated or described in connection with FIGS. 1 and 3A-8D, can be interchanged, used with, or instead of any feature, structure, component, etc. illustrated or described in connection with another example herein.

Example Method for Fabricating an Integrated Optical Assembly

Figure 9:
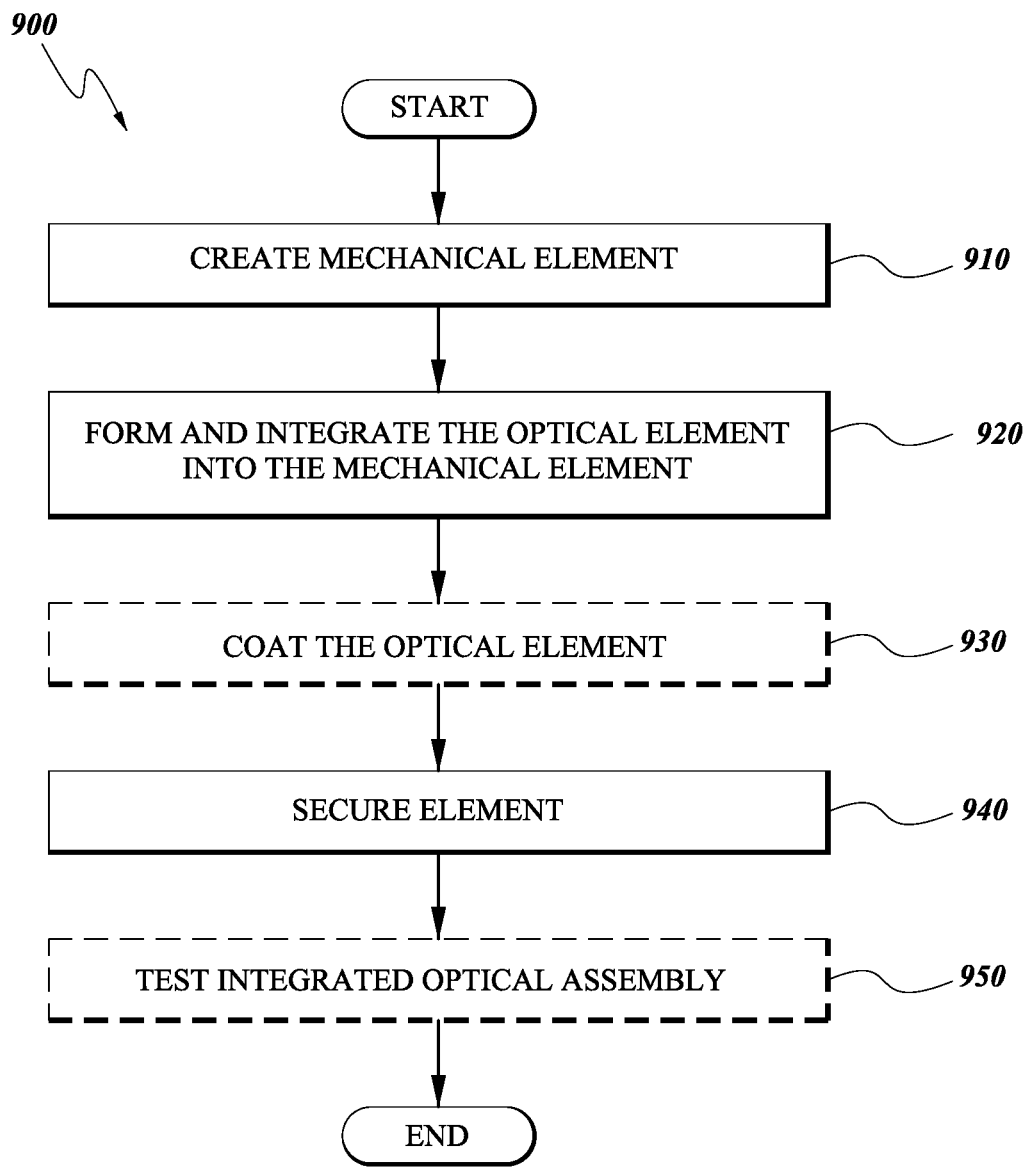
FIG. 9 is a process flow diagram of an example of a method of manufacturing an example integrated optical assembly comprising an optical element such as a lens that is transparent to visible and/or infrared (IR) wavelength light disposed in an optical mount.

FIG. 9 illustrates an example flowchart depicting a method 900 for fabricating an integrated optical assembly, in accordance with an example implementation. The integrated optical assembly may be a wide range of integrated optical assemblies, such as but not limited to the integrated optical assemblies as described in connection to FIGS. 1 and 3A-8D. Although the method 900 is illustrated in a particular order, the steps may be performed in a different order, or omitted, and additional steps can be added.

At block 910, the optics mount is manufactured or otherwise provided. The optics mount may be similar to one or more of the optics mounts disclosed herein (e.g., optics mount 130, 330, 430, 530, 630, 730, or 830 of FIGS. 1 and 3A-8D, respectively). The optics mount may be machined and/or otherwise fabricated. Similarly, the optics mount may comprise one or more materials, such as material specifically selected to match the material of the optical element, e.g., lens. Once the optics mount is formed, the method proceeds to block 920.

At block 920, the optical element transparent to IR and/or visible radiation, such as a lens or window, is simultaneously formed and integrated into the optics mount of block 910. For example, the transparent optical element may be formed in a manner as described above in connection to FIGS. 1, 2A, and 2B. The transparent optical element may be similar to the transparent optical elements described throughout this specification, for example, optical elements 110, 310, 410, 510, 610, 710, and 810 of FIGS. 1 and 3A-8D, respectively.

At block 940, the additional optical element is secured to the integrated optical assembly, for example, relative to the transparent optical element of block 920. The element may be any optical element configured to receive, interact with, and/or manipulate electromagnetic radiation (e.g., IR light), as described in connection to element 320 of FIGS. 3A-3C such as an optical aperture. Similarly, the element may be any element described throughout this disclosure and may be integrated with the integrated optical assembly for example using one of the approaches discussed herein or using another technique. For example, the element may be secured in a manner as described above in connection to FIGS. 3A-8D. However, other ways of integrating the additional optical element with the integrated optical assembly may be employed. Once the additional element is secured to the integrated optical assembly the method 900 may be completed.

In some implementations, optional block 930 may be included in method 900. For example, once the transparent optical element is formed at block 920, the method may proceed to optional block 930 where the transparent optical element may be coated. The coating at block 920 may be configured to provide a desired optical or other type of property to the transparent optical element or the integrated optical assembly, or may be for other purposes. The coating, for example, may be an anti-reflection coating, a spectral coating such as a notch filter that passes a narrow wavelength band, a filter to pass dual bands or broad band filter. Other types of coatings are possible. In some embodiments, optional block 930 may be performed after block 940.

In another implementation, optional block 950 may be included in method 900. For example, once the integrated optical assembly is completed in block 940, the integrated optical assembly may be tested in optional block 950 to determine and/or verify the optical performance of the integrated optical assembly. In some embodiments, optional block 950 may be performed to evaluate whether the fabrication process was performed within design tolerance to produce the desired integrated optical element.

Other Considerations

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

Indeed, it will be appreciated that the systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination. No single feature or group of features is necessary or indispensable to each and every embodiment.

Additionally, the various processes, blocks, states, steps, or functionalities may be combined, rearranged, added to, deleted from, modified, or otherwise changed from the illustrative examples provided herein. The methods and processes described herein are also not limited to any particular sequence, and the blocks, steps, or states relating thereto may be performed in other sequences that are appropriate, for example, in serial, in parallel, or in some other manner. Tasks or events may be added to or removed from the disclosed example embodiments. Moreover, the separation of various system components in the embodiments described herein is for illustrative purposes and should not be understood as requiring such separation in all embodiments.

It will be appreciated that conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Accordingly, the claims are not intended to be limited to the embodiments shown herein, but are to be accorded the widest scope consistent with this disclosure, the principles and the novel features disclosed herein.

What is claimed is:

1. An integrated optical assembly having an optical element molded from optically transparent material in an optics mount, the optical assembly comprising:

said optics mount comprising an opaque material, said optics mount being tubular in shape and having a first end and a second end and a middle region therebetween, said optics mount having in inner sidewall defining a hollow inner pathway from said first end, through said middle region, and to said second end, said inner sidewall having a circular cross-section at each of said first and second ends and said middle region, said optics mount having a longitudinal axis extending along a longitudinal direction of said housing through said circular cross-sections at said first and second ends and said middle region, said optical element comprising the optically transparent material and formed in the optics mount, the optically transparent material optically transparent to infrared light, visible light, or both such that said optical element is transparent to infrared light, visible light, or both, said optical element disposed in said optics mount, said optical element having a circular perimeter that fits within said optics mount against said inner sidewall, the optical element contacting said optics mount at an interface between said circular perimeter of said optical element and said inner sidewall of said optics mount having circular cross-section such that said optical element is held securely in said optics mount, wherein at the interface, the optically transparent material is in direct contact with the opaque material of said optics mount and adheres to the opaque material of said optics mount forming a seal free of bonding agents, the adhesion formed by the direct contact of the optically transparent material at a temperature higher than its transition temperature ($T_g$) with said optics mount when the optical element is formed in the optics mount, and then cooling the optically transparent material; and an optical aperture comprising an opaque sheet having a perimeter sufficiently small to fit within said optics mount and an opening located in said opaque sheet for light to pass, wherein the optical aperture is secured in fixed position with respect to said optics mount and said optical element on one side of said optical element that is closer to one of said first or second ends than said other side of said optical element and such that said longitudinal axis passes through said hole in said optical aperture.

2. The integrated optical assembly of claim 1, wherein said opaque material of said optics mount comprises at least one of aluminum, magnesium, or stainless steel.

3. The integrated optical assembly of claim 1, wherein said optical element is disposed in said middle region of said optics mount.

4. The integrated optical assembly of claim 1, wherein the circular cross-section at said middle region is smaller or equal to the circular cross-section at said first and second ends.

5. The integrated optical assembly of claim 1, wherein said optical element comprises a lens or a window.

6. The integrated optical assembly of claim 1, wherein said optical element comprises a lens having at least one side comprising:

a region having an optical power disposed along the longitudinal axis, and a planar region between said optics mount and the region having the optical power, wherein the optical aperture is secured adjacent to and substantially parallel to the planar region of said at least one side of said lens.

7. The integrated optical assembly of claim 1, wherein said optical element is transparent to infrared light and not transparent to visible light.

8. The integrated optical assembly of claim 1, wherein the optically transparent material comprises chalcogenide glass.

9. The integrated optical assembly of claim 1, wherein at the interface, the optically transparent material is directly adhered to the opaque material of said optics mount with no additional adhesive material therebetween.

10. The integrated optical assembly of claim 1, wherein said optical element protrudes from either or both said first or second ends of said optics mount.

11. The integrated optical assembly of claim 1, wherein said opaque sheet comprises material that is opaque to infrared or visible wavebands transmitted by the optically transmissive material comprising said optical element.

12. An integrated optical assembly having a first optical element molded from optically transparent material in an optics mount, the optical assembly comprising:

said optics mount comprising an opaque material, said optics mount being tubular in shape and having a first end and a second end and a middle region therebetween, said optics mount having an inner sidewall defining a hollow inner pathway from said first end, through said middle region, and to said second end, said inner sidewall having a cross-section at each of said first and second ends and said middle region, said optics mount having a longitudinal axis extending along a longitudinal direction of said housing through said cross-sections at said first and second ends and said middle region, said first optical element comprising the optically transparent material and formed in the optics mount, the optically transparent material optically transparent to infrared light, visible light, or both such that said first optical element is transparent to infrared light, visible light, or both, said first optical element disposed in said optics mount, said first optical element having a perimeter that fits within said optics mount against said inner sidewall, the first optical element contacting said optics mount at an interface between the perimeter of said first optical element and the inner sidewall of said optics mount such that said first optical element is held securely in said optics mount, wherein at the interface, the optically transparent material is in direct contact with the opaque material of said optics mount and adheres to the opaque material of said optics mount forming a seal free of bonding agents, the adhesion formed by the direct contact of the optically transparent material at a temperature higher than its transition temperature ($T_g$) with said optics mount when the first optical element is formed in the optics mount, and then cooling the optically transparent material; and a second optical element having a perimeter sufficiently small to fit within said optics mount, said second optical element configured to permit said light to pass, wherein the second optical element is secured in a fixed position with respect to said optics mount and said first optical element, the fixed position being on one side of said first optical element closer to one of said first or second ends than said other side of said first optical element and such that said central longitudinal axis passes through said second optical element.

13. The integrated optical assembly of claim 12, wherein the cross-section of said inner sidewall of said optics mount is circular.

14. The integrated optical assembly of claim 12, wherein the cross-section of said inner sidewall of said optics mount is elliptical or rectangular.

15. The integrated optical assembly of claim 12, wherein the opaque material comprising said optics mount comprises at least one of aluminum, magnesium, or stainless steel.

16. The integrated optical assembly of claim 12, wherein said optics mount has a length between about 0.5 mm and 50 mm.

17. The integrated optical assembly of claim 12, wherein the cross-section at said middle region is smaller than said cross-section at said first and second ends.

18. The integrated optical assembly of claim 12, wherein said first optical element comprises a lens or a window.

19. The integrated optical assembly of claim 12, wherein said first optical element comprises a plano-convex or plano-concave.

20. The integrated optical assembly of claim 12, wherein said first optical element comprises a biconcave, biconvex, or meniscus lens.

* * * * *